United States Patent
Mäenpää et al.

(10) Patent No.: US 12,318,802 B2
(45) Date of Patent: Jun. 3, 2025

(54) MODULAR DUAL WALL SPREADER WITH LIQUID STORAGE TANKS

(71) Applicant: Oy Hilltip Ab, Pietarsaari (FI)

(72) Inventors: Frank E. Mäenpää, Jakobstad (FI); Tom J. Mäenpää, Jakobstad (FI)

(73) Assignee: Oy Hilltip AB, Pietarsaari (FI)

( * ) Notice: Subject to any disclaimer, the term of this patent is extended or adjusted under 35 U.S.C. 154(b) by 491 days.

(21) Appl. No.: 16/822,623

(22) Filed: Mar. 18, 2020

(65) Prior Publication Data

US 2020/0298261 A1 Sep. 24, 2020

Related U.S. Application Data

(60) Provisional application No. 62/820,596, filed on Mar. 19, 2019.

(51) Int. Cl.
*B05B 9/03* (2006.01)
*B05B 13/00* (2006.01)

(52) U.S. Cl.
CPC ............ *B05B 9/035* (2013.01); *B05B 13/005* (2013.01)

(58) Field of Classification Search
CPC .............................. B05B 9/035; B05B 13/005
USPC ......................................................... 239/662
See application file for complete search history.

(56) References Cited

U.S. PATENT DOCUMENTS

| | | | |
|---|---|---|---|
| 3,401,890 A | * | 9/1968 | Middlesworth ........ A01M 11/00 239/662 |
| 4,230,280 A | * | 10/1980 | Leigh ..................... A01C 15/00 239/677 |
| 4,315,602 A | * | 2/1982 | Kubacak ................ A01M 7/005 239/587.5 |
| 4,442,979 A | * | 4/1984 | Kupper .................. E01C 19/203 239/677 |
| 6,148,863 A | | 11/2000 | Memory et al. |
| 6,817,551 B2 | | 11/2004 | Williams et al. |

(Continued)

FOREIGN PATENT DOCUMENTS

| DE | 4008630 | 9/1991 |
|---|---|---|
| DE | 4125965 | 4/1992 |

(Continued)

OTHER PUBLICATIONS

Internatinoal Search Report and Written Opinion for corresponding International Application No. PCT/EP2020/057539, dated Jul. 16, 2020.

*Primary Examiner* — Chee-Chong Lee
(74) *Attorney, Agent, or Firm* — Gardner, Linn, Burkhart & Ondersma LLP

(57) ABSTRACT

A reconfigurable modular hopper spreader assembly is mountable in the bed of a truck and includes a modular dual-wall hopper with a receptacle for storing solid material to be spread onto the ground and with individual liquid chambers for storing a liquid or different liquids to be sprayed onto the ground. The hopper spreader assembly further includes a fluid conduit for filling or draining the liquid into or out of the liquid chambers, a liquid pump fluidly connected with the liquid chambers for drawing the liquid from the liquid chambers, a selector valve fluidly connected with the fluid pump for directing the liquid drawn from the liquid chambers, and a liquid dispenser fluidly connected with the selector valve for distributing the liquid onto an application area.

21 Claims, 17 Drawing Sheets

(56) References Cited

U.S. PATENT DOCUMENTS

| | | |
|---|---|---|
| 7,108,196 B2 | 9/2006 | Kime |
| 7,355,509 B2 | 4/2008 | Rennie et al. |
| 7,400,058 B1 | 7/2008 | Wayne et al. |
| 7,714,705 B2 | 5/2010 | Rennie et al. |
| 7,737,576 B2 | 6/2010 | Wayne et al. |
| 8,120,473 B2 | 2/2012 | Rennie et al. |
| 8,185,276 B2 | 5/2012 | Buckbee et al. |
| 8,262,004 B2 | 9/2012 | Gamble, II et al. |
| 8,284,037 B2 | 10/2012 | Rennie et al. |
| 8,497,769 B2 | 7/2013 | Rennie et al. |
| 9,033,265 B2 | 5/2015 | Truan et al. |
| 9,035,755 B1 | 5/2015 | Rennie et al. |
| 9,085,862 B2 | 7/2015 | Norkus et al. |
| 9,096,979 B2 | 8/2015 | Larsen |
| 9,262,559 B2 | 2/2016 | Mewes et al. |
| 9,330,367 B2 | 5/2016 | Larsen |
| 9,371,621 B2 | 6/2016 | Norkus et al. |
| 9,562,333 B2 | 2/2017 | Sandler et al. |
| 9,601,015 B2 | 3/2017 | Rennie et al. |
| 9,757,744 B2 | 9/2017 | Truan et al. |
| 10,138,609 B2 | 11/2018 | Boschung et al. |
| 2003/0233937 A1 | 12/2003 | Martel |
| 2005/0184174 A1 | 8/2005 | Bailey et al. |
| 2005/0189444 A1 | 9/2005 | Kost |
| 2008/0156907 A1 | 7/2008 | Tremblay et al. |
| 2008/0203187 A1 | 8/2008 | Ward et al. |
| 2013/0233937 A1* | 9/2013 | Norkus ............ E01H 10/007 239/10 |
| 2014/0151463 A1 | 6/2014 | Ward et al. |
| 2016/0281311 A1 | 9/2016 | Jaccoma |
| 2017/0186326 A1 | 6/2017 | Rennie et al. |
| 2018/0044863 A1 | 2/2018 | Gamble, II et al. |
| 2019/0184433 A1* | 6/2019 | Reed ................ B05B 9/0403 |

FOREIGN PATENT DOCUMENTS

| | | |
|---|---|---|
| FR | 2667335 | 4/1992 |
| WO | 2014005647 | 1/2014 |

* cited by examiner

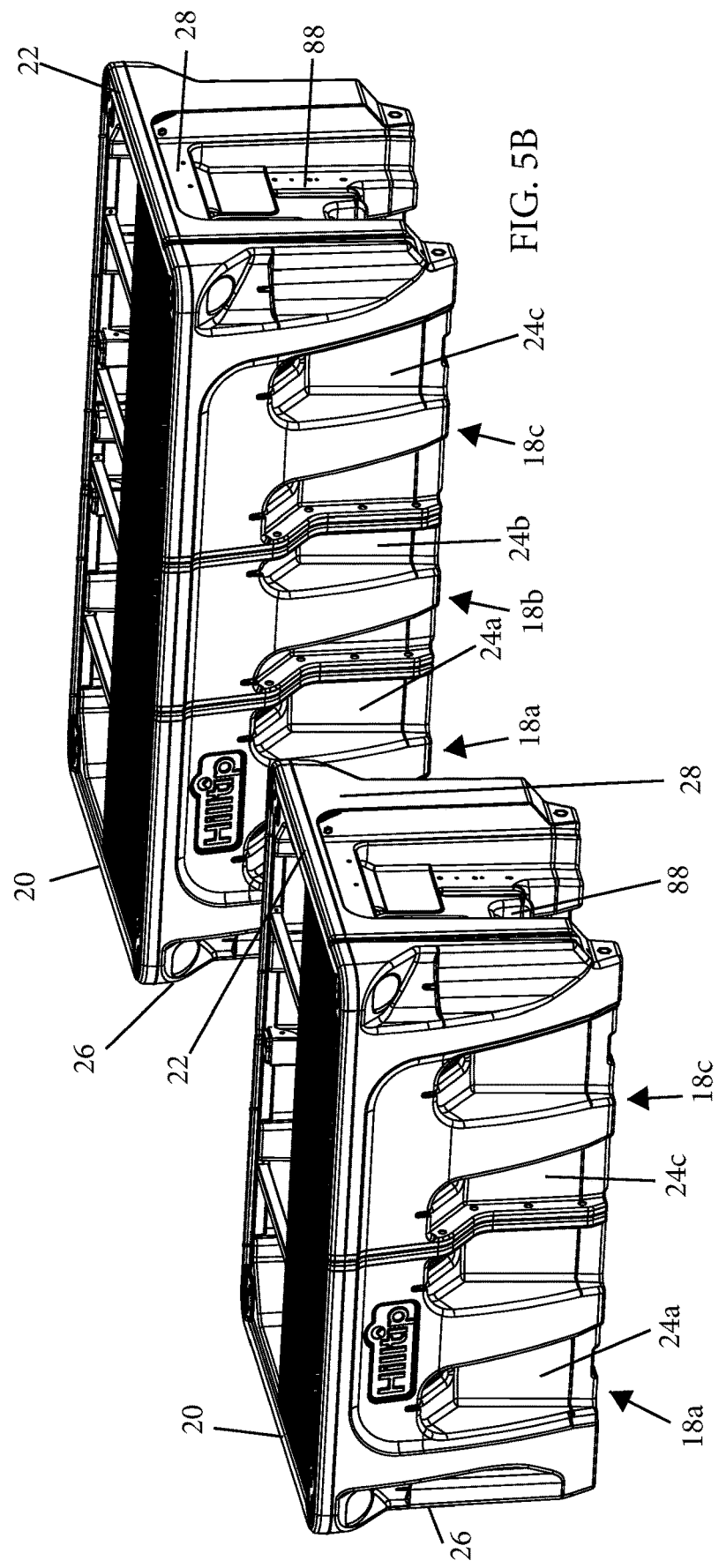

MODULAR DUAL WALL SPREADER WITH LIQUID STORAGE TANKS

CROSS REFERENCE TO RELATED APPLICATION

The present application claims priority to U.S. provisional patent application Ser. No. 62/820,596, filed Mar. 19, 2019, which is hereby incorporated herein by reference in its entirety.

FIELD OF THE INVENTION

The present invention generally relates to a vehicle mounted assembly for spreading granular particles and/or spraying liquid onto the ground or road surfaces.

BACKGROUND OF THE INVENTION

The spreading of salt, sand, seed, fertilizer, or other generally dry, free-flowing material is common in many areas of road or driveway maintenance, landscaping, and agriculture. Various types of hopper spreader apparatuses that are mounted on a vehicle or towed by the vehicle have been developed for spreading or dispensing dry, free-flowing materials, with some hopper spreader units being permanently or semi-permanently mounted onto vehicles such as heavy duty trucks, while others, known as "insert hopper spreaders," may be removably mounted onto vehicles such as pick-up trucks.

SUMMARY OF THE INVENTION

The present invention provides a hopper spreader assembly that has a modular dual-wall hopper for containing one or more liquids to be sprayed and for also containing dry, free-flowing material to be spread. The hopper spreader assembly facilitates dispersion of liquid and solid material separately or together, which can include such applications as dust control, dispensing of pesticides, herbicides, liquid salt, or liquid deicers, for example. The hopper spreader assembly can be built or reconfigured to different sizes, i.e. shortened or elongated, depending on vehicle size and volume(s) of solid/liquid materials required. The modular construction of the hopper spreader assembly further allows for its parts to be easily repaired and/or replaced, to avoid a costly replacement of the entire hopper in case of damage or disrepair. The modular double wall hopper construction of the hopper spreader assembly, in turn, allows for one or different liquids to be carried and subsequently dispensed by the hopper spreader assembly, and further reduces the turbulence of the liquid(s) carried by the hopper spreader assembly, which improves stability of the vehicle carrying or towing the hopper spreader assembly on the road.

In one form of the present invention, a hopper spreader assembly for spraying liquid(s) and spreading solid material includes a first dual-wall hopper module and a second dual-wall hopper module. The first dual-wall hopper module has a first liquid chamber defined between a first inner surface portion and a first outer surface portion. The second dual-wall hopper module has a second liquid chamber defined between a second inner surface portion and a second outer surface portion. The first inner surface portion cooperates with the second inner surface portion to define a receptacle for receiving and storing solid material such that the first and second hopper modules form a hopper that is sized and shaped to be received on a bed of a truck or a support vehicle. The hopper spreader assembly further includes a fluid conduit for filling or draining a liquid into or out of the first and second liquid chambers, a liquid pump in fluid communication with the first and second liquid chambers for drawing the liquid from the first and second liquid chambers, a selector valve in fluid communication with the fluid pump for directing the liquid drawn from the first and second liquid chambers, and a liquid dispenser in fluid communication with the selector valve for distributing the liquid onto an application area.

According to an aspect of the present invention, the fluid conduit is configured to inter-connect the first and second hopper modules in fluid communication with one another. The fluid conduit includes a plurality of liquid fittings, each liquid fitting adapted to fluidly connect a respective one of the first or second liquid chambers with the fluid conduit.

According to another aspect, the hopper spreader assembly further includes a central processing unit (CPU) communicatively connected to the selector valve and operable to control the selector valve. The selector valve is electrically operable in response to operator commands received from the CPU, and manually operable in response to manual intervention by an operator.

According to yet another aspect, the liquid dispenser includes a pre-wet nozzle, a hose reel with a dispensing hose, and a spray bar, each selectively supplied with the liquid through the selector valve controlled by the CPU.

According to still another aspect, each of the first and second hopper modules includes a pair of corner openings configured to receive respective lifting and mounting assemblies. Each lifting and mounting assembly includes an elongated spacer, an upper plate disposed at an upper end of the spacer, a ring member with a ring plate and a nut fastener disposed at a lower end of the spacer, and a corner bolt extending through the spacer and threadably engaging the nut fastener.

In a further aspect, the first and second hopper modules are secured together by a structural support that includes a pair of generally parallel rods extending longitudinally along the first and second inner surface portions. Each rod has opposite end portions that are configured to couple to respective corner portions of the first and second hopper modules. The rods are coupled together by at least one structural bar laterally extending between the rods.

In yet a further aspect, the hopper spreader assembly further includes a third dual-wall hopper module disposed between the first and second hopper modules. The third dual-wall hopper module has a third liquid chamber defined between a third inner surface portion and a third outer surface portion. The first, second, and third dual-wall hopper modules are correspondingly shaped and cooperate to form the hopper defining the receptacle. The first, second, and third liquid chambers are interconnected in fluid communication with one another to form a single liquid reservoir. The first, second, and third inner surface portions are at least partially angled and converging at a bottom of the receptacle so that said receptacle is shaped as a trough. Each of the first, second, and third liquid chambers is in fluid communication with the selector valve that directs the liquid drawn from the first, second, and third liquid chambers to the liquid dispenser for distributing the liquid onto the application area. The third dual-wall hopper module includes separate left and right module portions disposed on opposite lateral sides of the hopper.

In still another aspect, each module further includes a pair of side walls. Each side wall includes a flange with a plurality of openings for receiving fasteners to removably secure each hopper module to a respective adjacent hopper module. Each pair of adjacent flanges is further secured together by a structural brace.

In yet another aspect, the hopper spreader assembly further includes a hopper module insert defining a fourth liquid chamber disposed within the receptacle. The fourth liquid chamber is in fluid communication with the selector valve and the liquid dispenser. The fourth liquid chamber is not connected in fluid communication with the first, second, or third liquid chambers.

In still another aspect, the selector valve comprises a plurality of selector valves including a first selector valve configured to direct the liquid drawn from the fourth liquid chamber to at least one of the pre-wet nozzle, spray bar, and the dispensing hose of the hose reel, and a second selector valve configured to direct the liquid drawn from the first and second liquid chambers to the at least one of the pre-wet nozzle, the spray bar, and the dispensing hose.

In yet another aspect, the hopper spreader assembly further includes a rinse line with a rinse valve fluidly connected to the first, second, third, and fourth liquid chambers. The rinse line is configured to fill the first, second, third and fourth liquid chambers with a cleaning solution to be drained through any one of the pre-wet nozzle, the spray bar, and the dispensing hose.

In still another aspect, the hopper spreader assembly further includes a spreader assembly that includes (i) a pre-wet nozzle and a spray bar of said liquid dispenser and (ii) a spinner system. The hopper defines a lower aperture for receiving an auger or conveyor mechanism that is adapted to move the solid material from the receptacle to the spreader assembly.

In another form of the present invention, a hopper spreader assembly for spraying liquid(s) and spreading solid material includes a first dual-wall hopper module and a second dual-wall hopper module. The first dual-wall hopper module has a first liquid chamber defined between a first inner surface portion and a first outer surface portion. The second dual-wall hopper module has a second liquid chamber defined between a second inner surface portion and a second outer surface portion. The hopper spreader assembly further includes a fluid conduit for filling or draining a liquid into or out of the first and second liquid chambers, a liquid pump in fluid communication with the first and second liquid chambers for drawing the liquid from the first and second liquid chambers, a hose reel with a dispensing hose for distributing the liquid onto an application area, a pre-wet nozzle for distributing the liquid onto the application area, and a selector valve in fluid communication with the fluid pump for directing the liquid drawn from the first and second liquid chambers to the hose reel and the pre-wet nozzle. The first inner surface portion cooperates with the second inner surface portion to define a receptacle for receiving and storing solid material such that the first and second hopper modules form a hopper that is sized and shaped to be received on a bed of a truck or a support vehicle.

In yet another form of the present invention, a hopper spreader assembly for spraying liquid(s) and spreading solid material includes a first dual-wall hopper module, a second dual-wall hopper module, and a third dual-wall hopper module. The first dual-wall hopper module has a first liquid chamber defined between a first inner surface portion and a first outer surface portion. The second dual-wall hopper module has a second liquid chamber defined between a second inner surface portion and a second outer surface portion. The third dual-wall hopper module has a third liquid chamber defined between a third inner surface portion and a third outer surface portion. The hopper spreader assembly further includes a fluid conduit for filling or draining a liquid into or out of the first, second, and third liquid chambers. A liquid pump operable to draw the liquid from the first, second, and third liquid chambers. A hose reel with a dispensing hose operable to distribute the liquid onto an application area. A pre-wet nozzle operable to distribute the liquid onto the application area, and a selector valve in fluid communication with the fluid pump for directing the liquid drawn from the first, second, and third liquid chambers to the hose reel and the pre-wet nozzle. The fluid conduit extends along a lower surface of each of the first, second, and third hopper modules and comprises a plurality of liquid fittings, each of which is adapted to fluidly connect a respective one of the first, second, and third liquid chambers with the fluid conduit. The first, second, and third inner surface portions cooperate to define a receptacle for receiving and storing solid material such that the first, second, and third hopper modules form a hopper that is sized and shaped to be received on a bed of a truck or a support vehicle.

According to an aspect of the present invention, the hopper spreader assembly further includes a hopper module insert defining a fourth liquid chamber disposed within the receptacle. The fourth liquid chamber is in fluid communication with the selector valve, the hose reel, and the pre-wet nozzle. The fourth liquid chamber is not connected in fluid communication with the first, second, and third hopper modules.

Thus, the present invention provides a modular hopper spreader assembly that is reconfigurable in size and volume, with spreading equipment and various liquid dispensing equipment. The spreading and dispensing equipment, which can receive liquids and solids from different chambers, allows the hopper spreader assembly to separately or concurrently spread solid material and dispense one or more liquids onto the ground and/or road surfaces, depending on an application.

These and other objects, advantages, purposes and features of the present invention will become apparent upon review of the following specification in conjunction with the drawings.

BRIEF DESCRIPTION OF THE DRAWINGS

FIGS. 5A and 5B are perspective views of the respective modular hoppers of FIGS. 4A and 4B, each shown with a structural support frame and a screen portion attached thereto;

DETAILED DESCRIPTION OF PREFERRED EMBODIMENTS

Aspects of the present disclosure relate to a modular dual-wall hopper spreader with individual storage tanks or chambers within the hopper spreader for storing and dispensing or spraying solid particles or liquid(s) onto the ground and/or road surfaces. In the following description, numerous specific details of different embodiments are set forth in order to provide a thorough understanding of the present invention. However, it will be understood to one skilled in the art that the present invention may be embodied in a wide variety of configurations.

Figure 1:
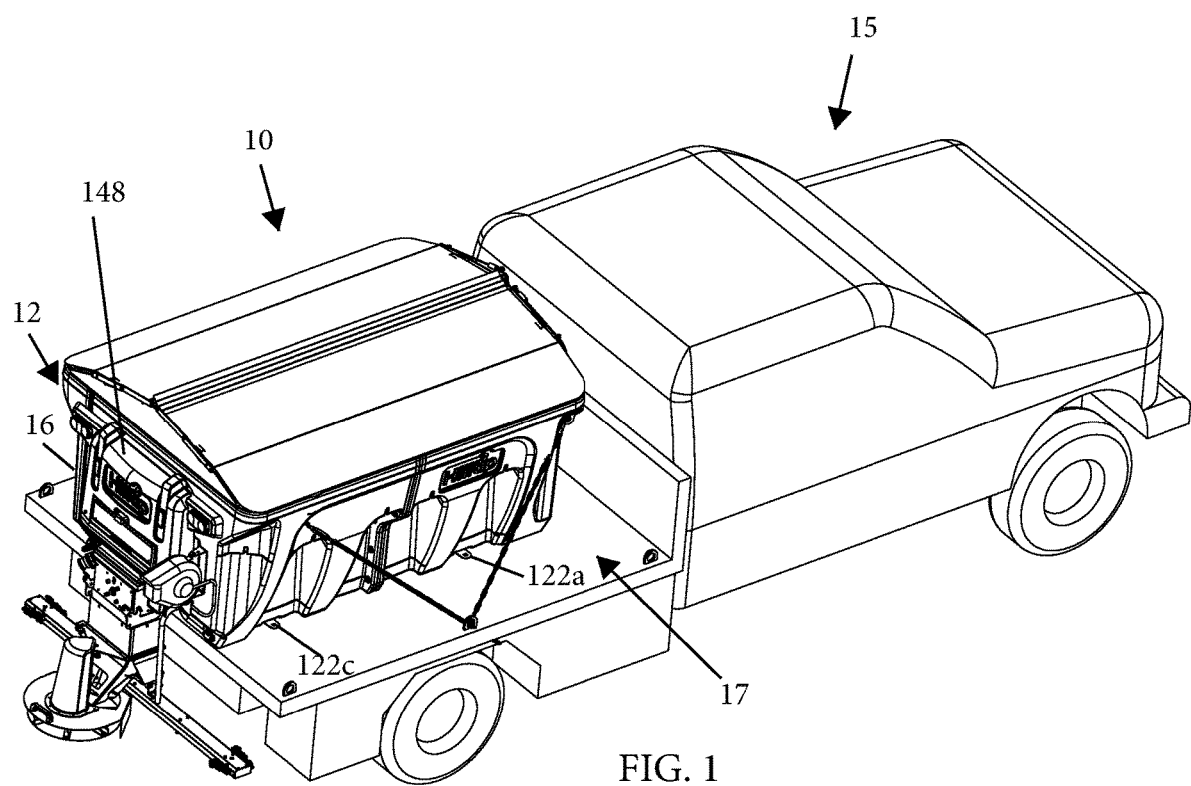
FIG. 1 is a perspective view of a modular double-wall hopper spreader, in accordance with the present invention, shown mounted on a bed of a vehicle.
Figure 2:
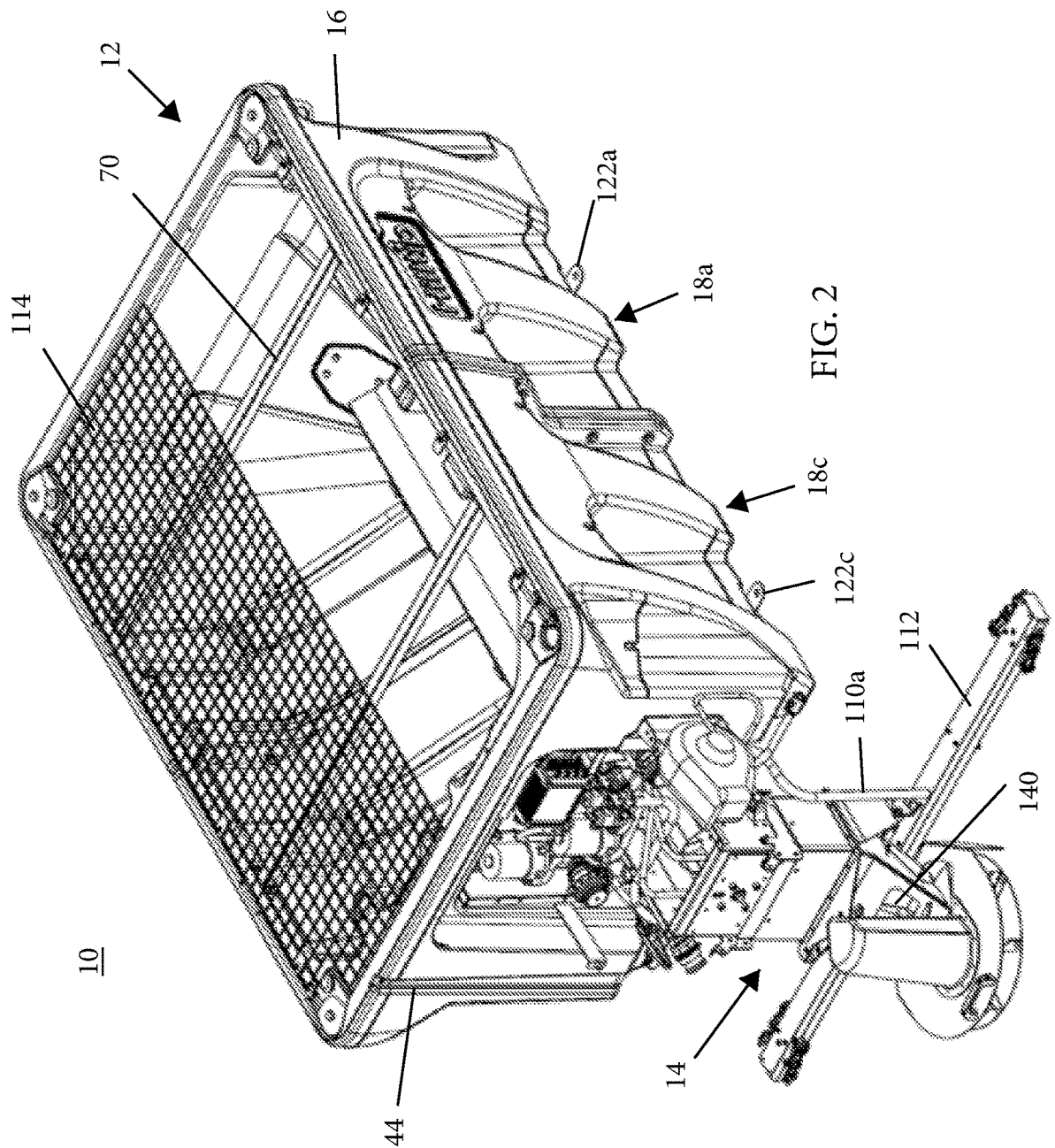
FIG. 2 is a top perspective view of the modular hopper spreader of FIG. 1.

Referring now to the drawings and the illustrative embodiments depicted therein, a hopper spreader assembly 10 includes a hopper assembly 12 and a spreader assembly 14, such as shown in FIGS. 1 and 2. Hopper assembly 12 includes a plurality of structural support members and a plumbing system attached to or supported by a generally rectangular, modular, dual-wall insert hopper 16, which is sized and shaped to be received on or in a bed 17 of a pick-up truck 15 or other support vehicle, such as shown in FIG. 1. As best shown in FIGS. 4A-6B, hopper 16 is constructed of separate correspondingly-shaped double-wall modules, which can be assembled and plumbed together to form completed assemblies having different dimensions and capabilities, as will be described in more detail below.

Figure 4A:
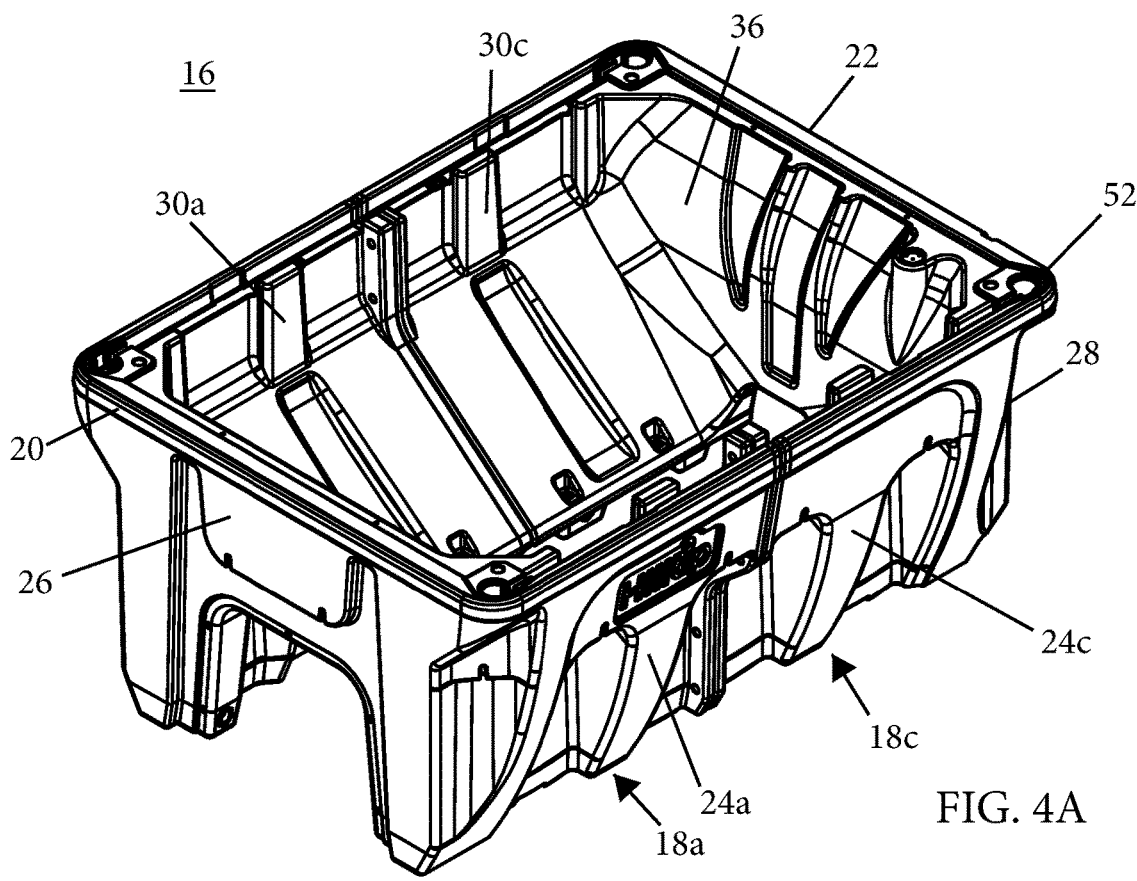
FIG. 4A is a perspective view of a modular hopper of the modular hopper spreader of FIG. 2.
Figure 4B:
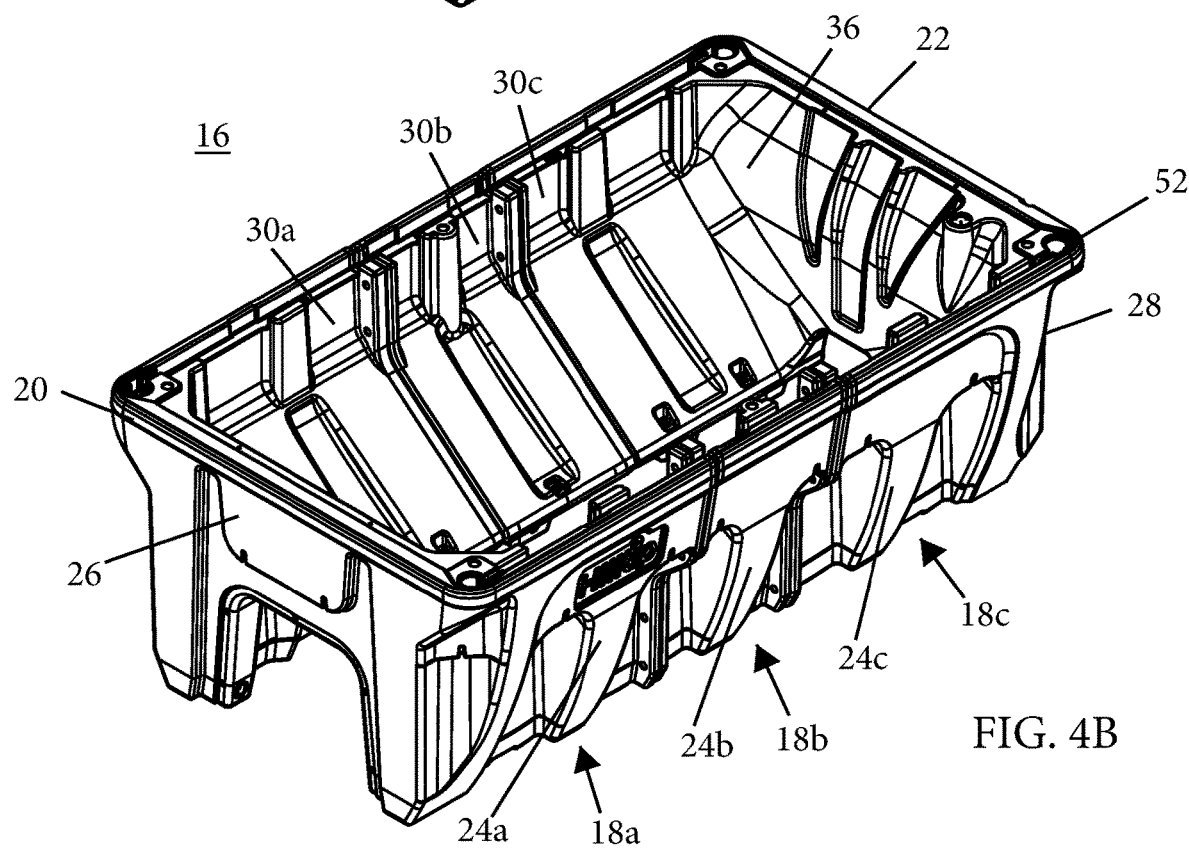
FIG. 4B is a perspective view of an extended modular hopper.

In the illustrated embodiment of FIGS. 4B, 5B, 6A and 6B, hopper 16 may be constructed of three separate correspondingly-shaped double-wall modules 18a, 18b, 18c each having lateral opposite sides. A front module 18a is located proximal to the cabin of the pick-up truck 15, and a rear module 18c is proximal to the rear end of the truck's bed 17. A middle module 18b is a two-piece module positioned and secured between the front and rear modules 18a and 18c, respectively. As will be described in more detail below, solid and liquid materials carried within hopper 16 may be selectively discharged onto a ground surface, such as a road surface, based on signals received from an operator. In the embodiment of FIGS. 4A and 5A, hopper 16 is shown as a "short version" and is constructed only of the front and rear modules 18a and 18c. The modular (piecemeal) construction of hopper 16 allows it to be easily assembled as the "short version" of FIGS. 4A and 5A, or as the "extended version" that includes the middle module 18b of FIGS. 4B and 5B. Thus, hopper 16 may be constructed as a shortened version by omitting the middle module 18b, or may be constructed as an elongated version by inserting one or more correspondingly-shaped middle modules 18b, which may be of different longitudinal lengths, between front module 18a and rear module 18c. It will be appreciated that constructing hoppers 16 of different lengths may necessitate changes in length of other components of the hopper spreader assembly 10, which will be described in more detail below.

The double wall modules 18a-c may be formed of a plastic material, such as a linear medium density polyethylene, though it will be appreciated that any suitable polymeric plastic material, metal, and/or fiber-reinforced panels may be utilized in accordance with sound engineering judgment. Preferably, the material used is lightweight and corrosion resistant due to the nature of the products it will be carrying and dispensing. Optionally, the modules 18a-c may be formed of resinous plastic in a rotational molding process. Each module 18a-c includes a hollow inner cavity defined by respective inner and outer surfaces of modules 18a-c, which will be discussed in more detail below.

With reference to FIGS. 4A-6B, each module 18a-c has a pair of respective opposite outer side walls 24a-c, with front module 18a additionally including a forward end wall 26 defining a front end 20, and with rear module 18c additionally including a rear end wall 28 defining a rear end 22. Hopper 16 is longitudinally defined by the forward end wall 26 and the rear end wall 28, and laterally by the outer side walls 24a-c of modules 18a-c (or by only the outer side walls 24a, 24c of the front module 18a and the rear module 18c for the short version of hopper 16). Thus, front module 18a and rear module 18c are each unitarily formed as a generally U-shaped piece. The middle module 18b of the extended hopper 16 is formed by a pair of separate modules that are selectively inserted opposite one another between U-shaped front module 18a and rear module 18c. Optionally, the two separate modules that together form the middle module 18b are identical to one another, and thus can be formed in the same mold. It should be understood that the overall construction of the short version of the hopper 16 is identical to that of the extended version, except that the middle module 18b present in the extended version is omitted from the short version.

Figure 6A:
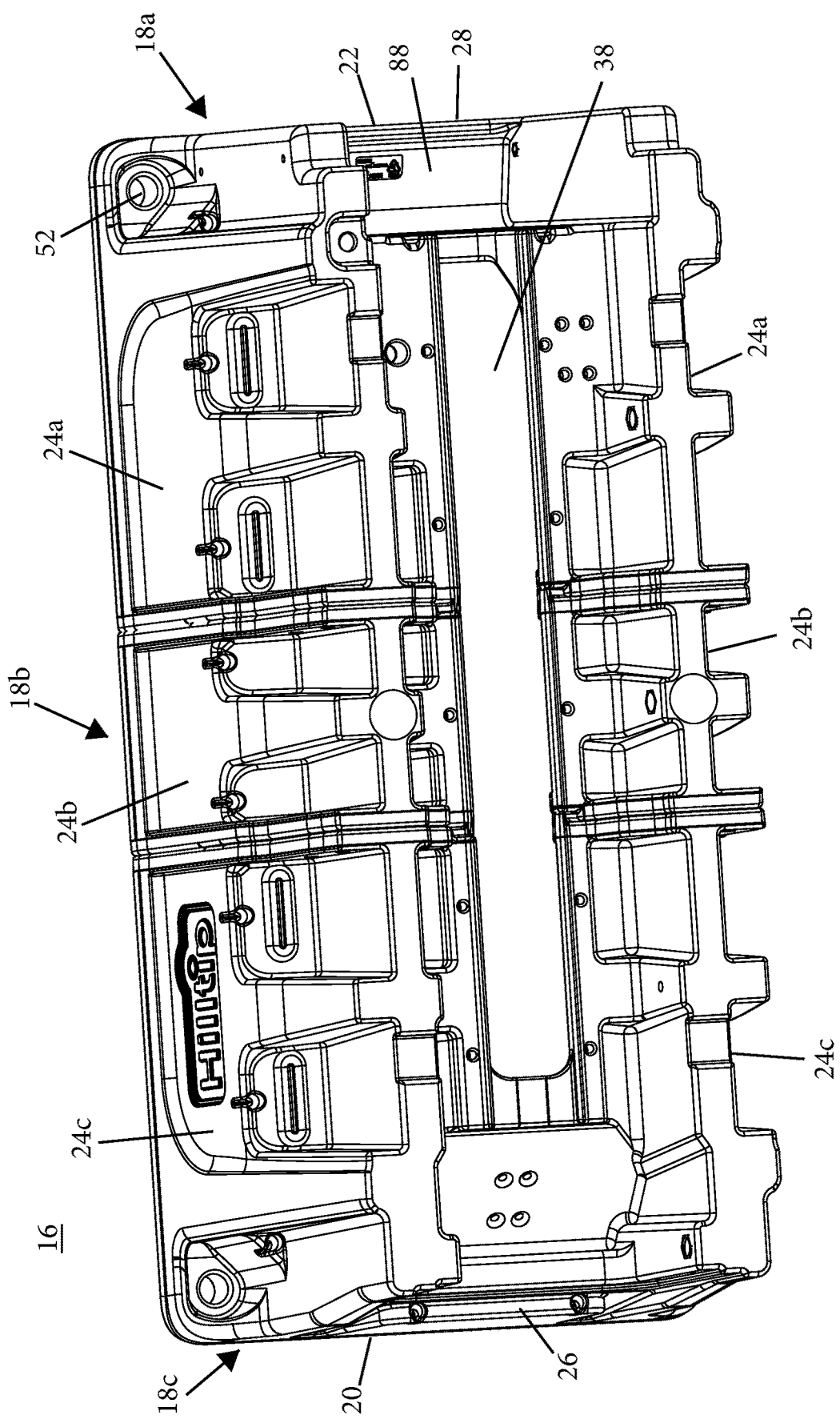
FIG. 6A is a bottom perspective view of the extended modular hopper of FIG. 4B.
Figure 6B:
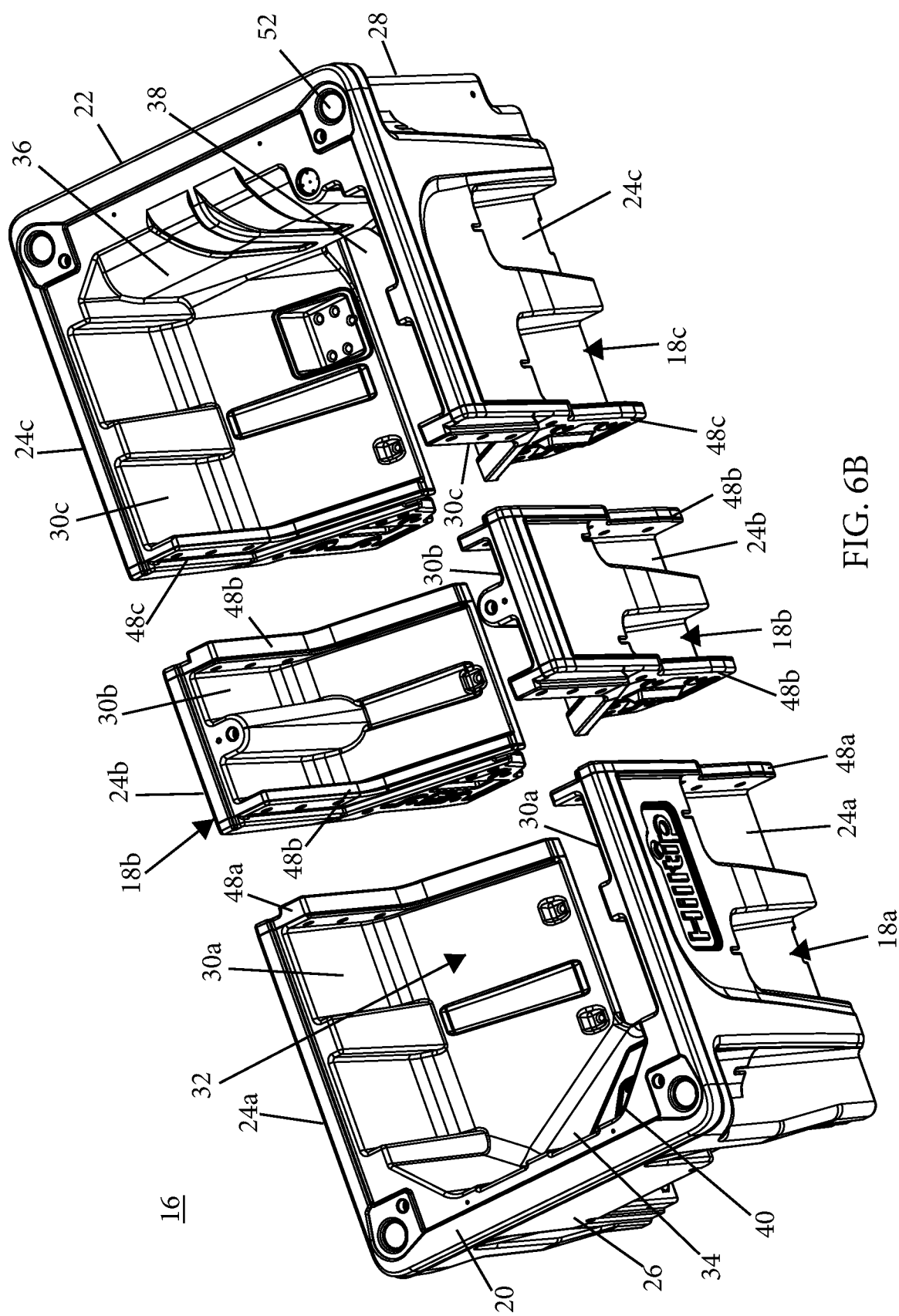
FIG. 6B is an exploded top perspective view of the extended modular hopper of FIG. 4B.

Each module 18a-c also has a respective pair of opposite front inner surfaces 30a, middle inner surfaces 30b, and rear inner surfaces 30c that laterally define a solids receptacle 32 (FIG. 6B). As best seen in FIG. 6B, receptacle 32 is longitudinally defined by a forward inner surface 34 of front module 18a that extends between the front module's pair of opposite front inner surfaces 30a, and by a rearward inner surface 36 of rear module 18c, the rearward inner surface 36 extending between the rear module's pair of opposite rear inner surfaces 30c. Respective front, middle, and rear inner surfaces 30a, 30b and 30c of modules 18a-c, and the respective forward and rearward inner surfaces 34 and 36 of front and rear modules 18a and 18c are sloped so that receptacle 32 has a trough-like inner shape with the sloped surfaces converging at the bottom of receptacle 32. Receptacle 32 may be used to hold a solid or generally dry, free-flow material, such as salt, sand, fertilizer, or the like, that is used to treat a ground surface. Receptacle 32 is in communication with an aperture 38 (FIGS. 6A and 6B) defined between lower regions of the modules 18a-c so that the solid contents of receptacle 32 may be applied to the ground surface. With reference to FIG. 6B, hopper 16 may include a vibrator 40 mounted towards a lower portion of the forward inner surface 34 of front module 18a to help direct the solid contents closer to aperture 38 and/or to loosen any solid materials remaining on the inner surfaces 30a, 30b, 30c, 34, 36 of receptacle 32.

The hollow inner cavities or liquid chambers of modules 18a-c are formed by their respective outer side walls 24a-c, 26, 28 and inner surfaces 30a-c, 34, 36. For example, the hollow inner cavity of front module 18a is formed by the pair of opposite outer side walls 24a connected by the forward end wall 26 and the pair of opposite front inner surfaces 30a connected by the forward inner surface 34. The hollow inner cavity of rear module 18c is formed by the pair of opposite outer side walls 24c connected by the rearward end wall 28 and the pair of opposite rear inner surfaces 30c connected by the rearward inner surface 36. The hollow inner cavity of each module of the pair of separate modules of middle module 18b is formed by an outer side wall 24b and the middle inner surface 30b.

The modular construction of hopper 16 allows each module 18a-c to define a separate hollow portion forming a liquid chamber for carrying liquid material, with each lateral side of the front, middle, and rear modules 18a-c being in fluid communication with the opposing side of that module. It should be understood that each separate liquid chamber of individual modules 18a-c may carry or store different liquid materials that may be used to treat the ground surface. In an alternative embodiment, however, the separate liquid chambers of modules 18a-c may be in fluid communication with one another via inner-modular plumbing, such as pipes, valves, fluid fittings, plumbing fixtures, or other apparatuses conveying fluids, such that the combination of the respective hollow portions or liquid chambers of modules 18a-c effectively forms a single liquid reservoir of hopper 16.

Figure 3:
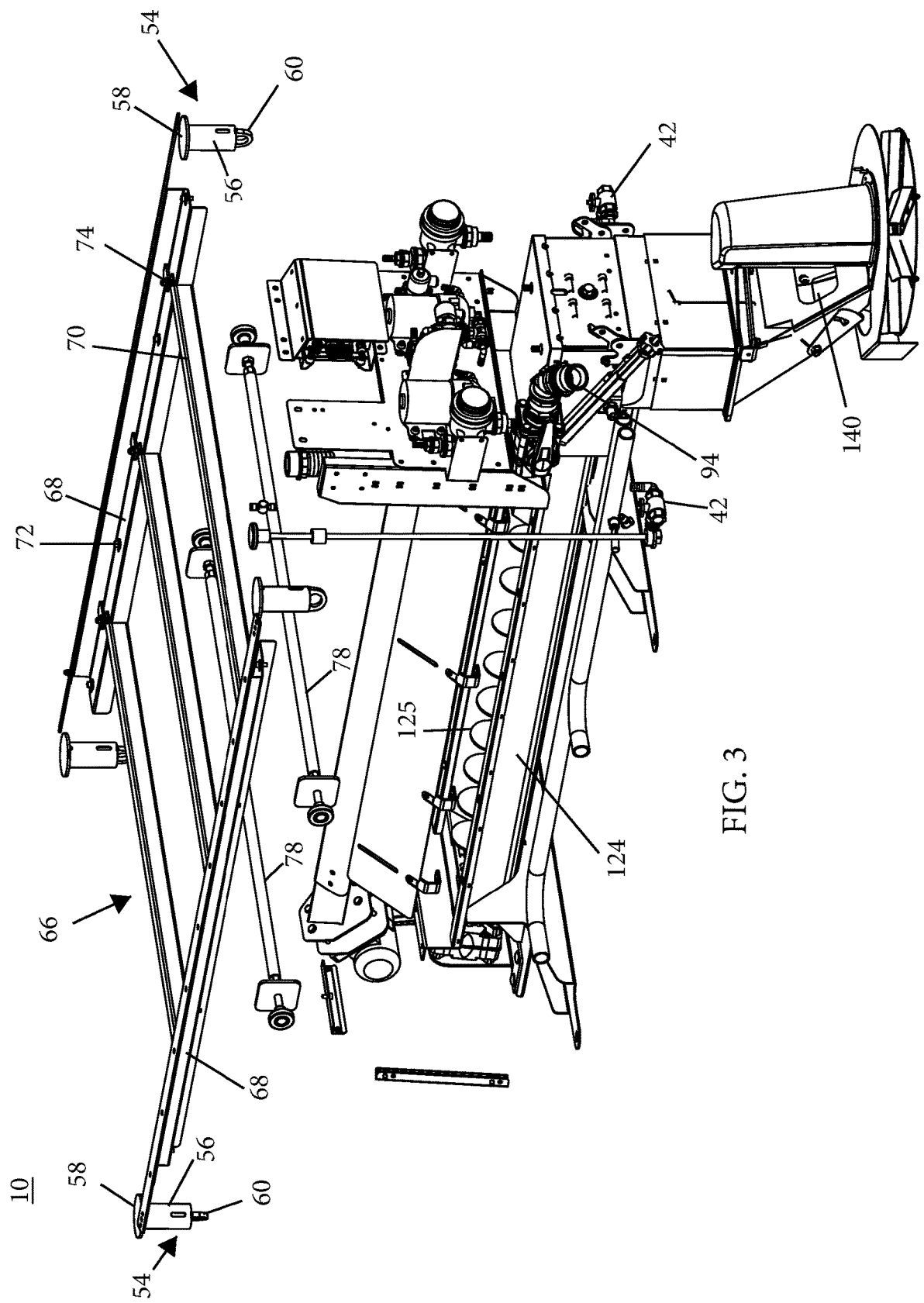
FIG. 3 is a perspective view of structural and plumbing/spreading components of the modular hopper spreader with hopper modules omitted for clarity.
Figure 13A:
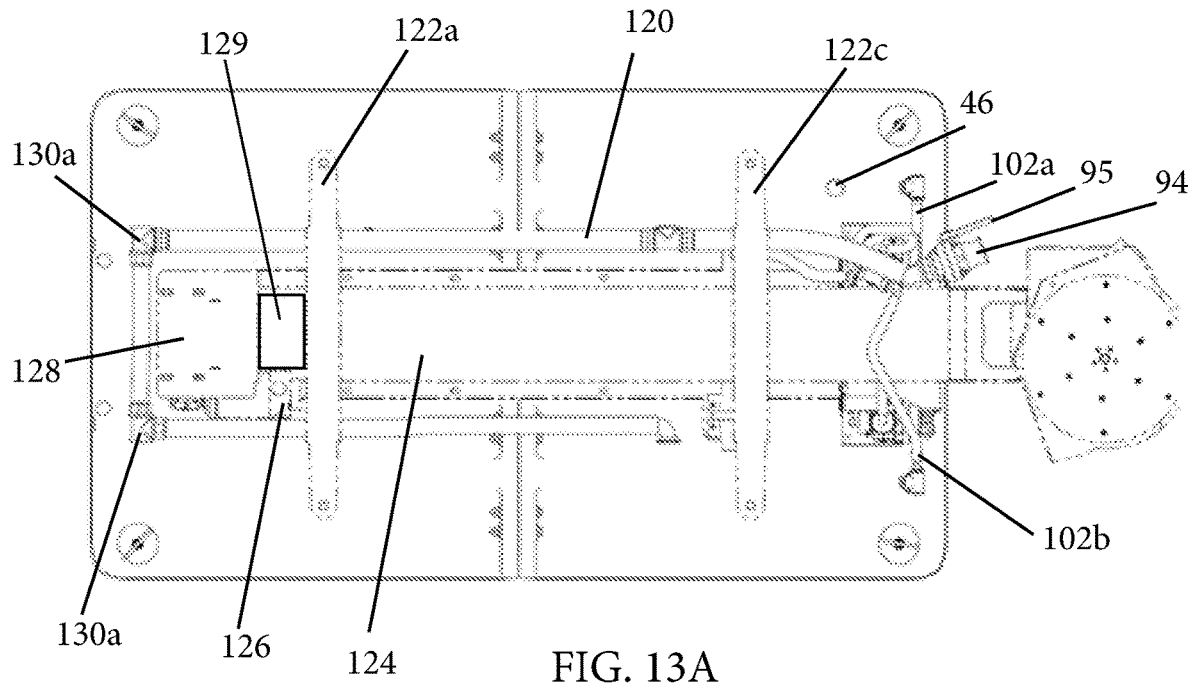
FIG. 13A is a bottom view of another modular hopper spreader of the present invention and depicting another plumbing system.
Figure 13B:
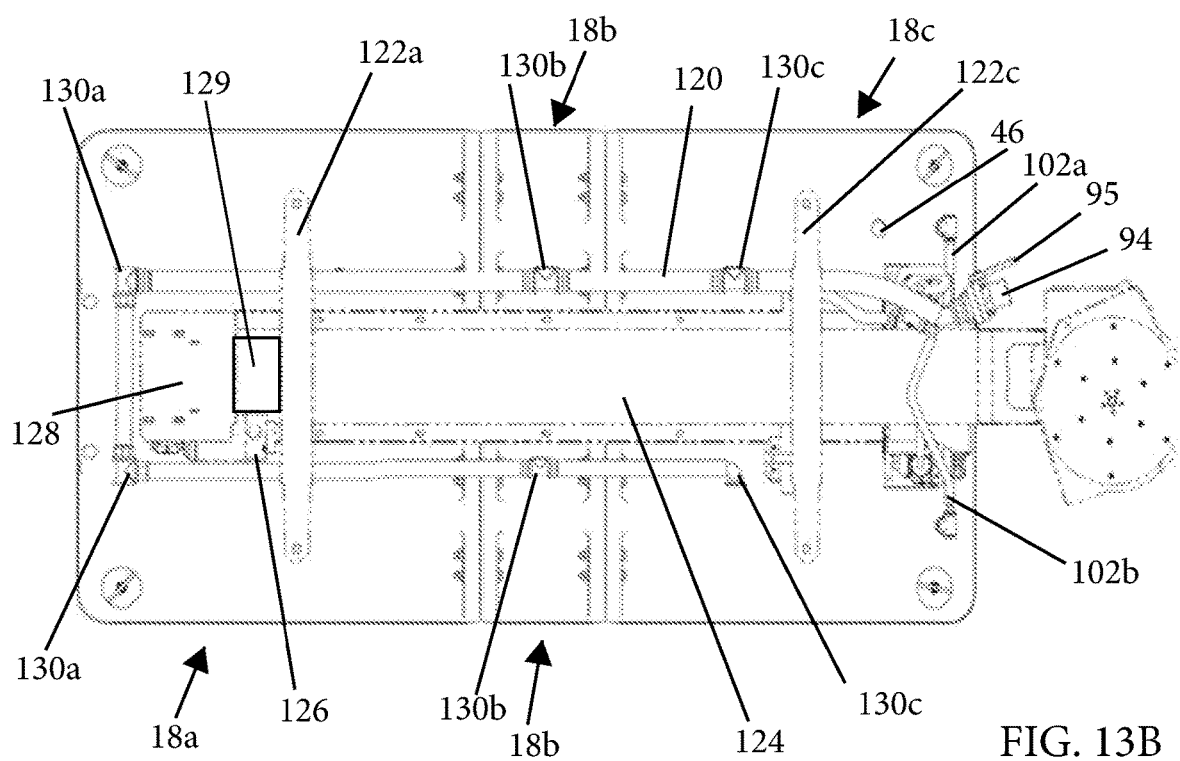
FIG. 13B is a bottom view of an extended modular hopper spreader of FIG. 13A.

Optionally, the hopper spreader assembly 10 includes an emptying and suction valve 42, shown in FIG. 3, for draining the liquid material out of the liquid chambers of modules 18a-c. In the illustrated embodiment, there are two emptying and suction valves 42 connected to respective opposite sides of rear module 18c. It is further envisioned that the front and middle modules 18a, 18b may also have at least one emptying and suction valve 42, if desired. The rear end wall 28 of rear module 18c may also include a liquid level indicator 44 (FIG. 2). Indicator 44 may be a clear hose in fluid communication with the liquid chambers of modules 18a-c to show the liquid levels at a glance. It is also envisioned within the scope of the present disclosure that the hopper spreader assembly 10 includes, instead or in addition to the liquid level indicator 44, an electronic liquid level sensor 46, as shown in FIGS. 13A and 13B.

Referring to FIGS. 4A-6B, front module 18a includes a rear end region, middle module 18b includes front and rear end regions, and rear module 18c includes a front end region. The rear end region of front module 18a includes a pair of upright-extending front flanges 48a, the front and rear end regions of middle module 18b include a pair of upright-extending middle flanges 48b, and the front end region of rear module 18c includes a pair of upright-extending rear flanges 48c. Each flange 48a-c laterally outwardly extends from respective outer side walls 24a, 24b, and 24c, and laterally inwardly extends from respective inner surfaces 30a, 30b, and 30c. As shown in FIG. 6B, each pair of middle flanges 48b of middle module 18b abuts adjacent flanges 48a and 48c of respective front module 18a and rear module 18c for additional structural support, strength and stability of modular hopper 16. In the illustrative embodiment of FIG. 14, the respective flanges of adjacent modules may be fixedly secured together by a plurality of removable flange fasteners 50. It is thus envisioned that the adjacent modules 18a-c formed with the flanges 48a-c described above allow the modules to be bolted or otherwise fastened together without relying on other structures to hold hopper 16 as a unitary piece. It should also be apparent that if the two-piece middle module 18b is absent, opposing front flanges 48a of front module 18a are removably securable by flange fasteners 50 to opposing rear flanges 48c of adjacent rear module 18c.

Figure 7A:
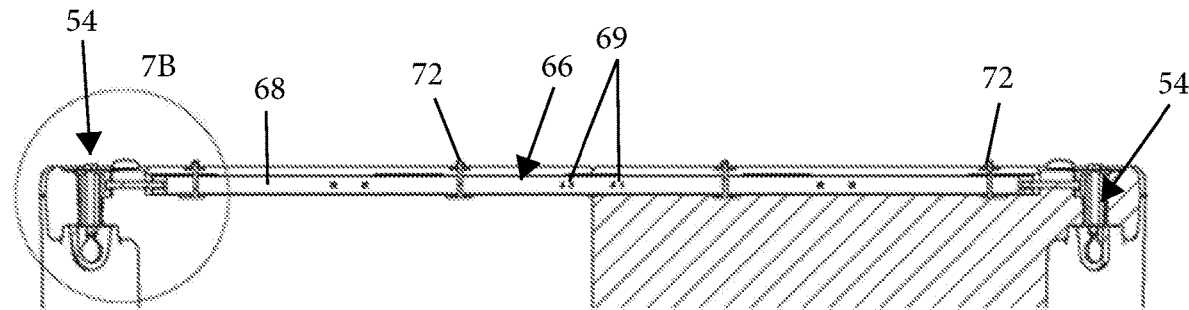
FIG. 7A is a side sectional view of a portion of the modular hopper spreader of FIG. 5A, showing the structural support frame.
Figure 7B:
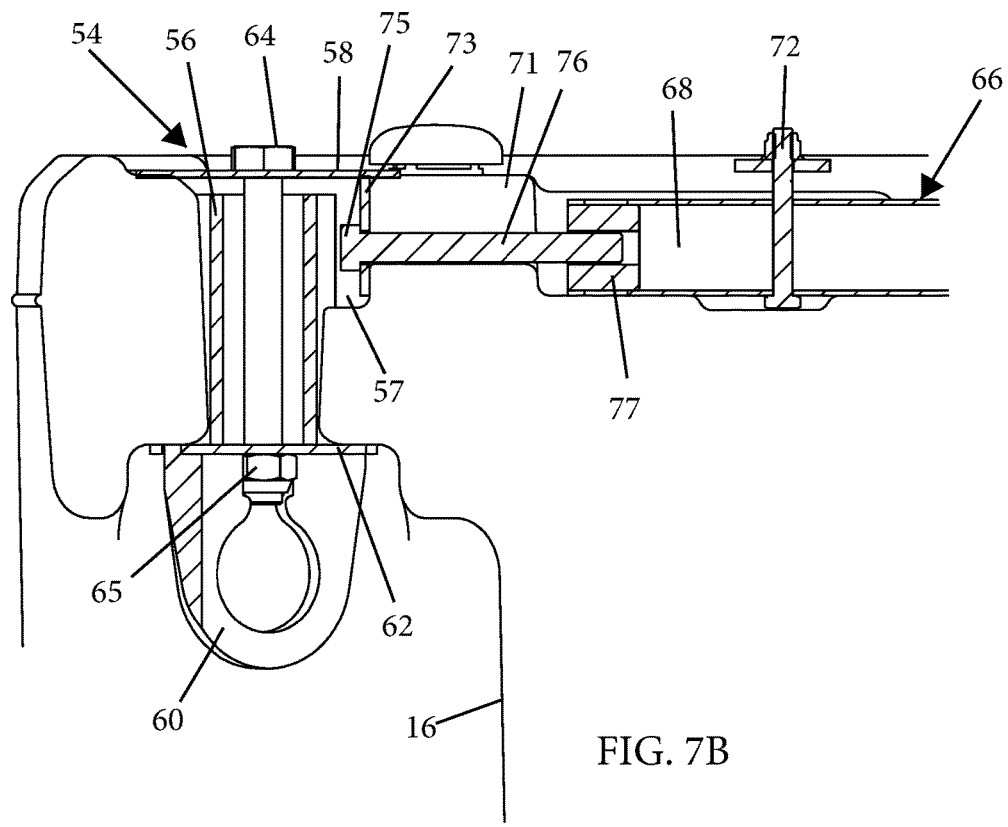
FIG. 7B is an enlarged view of the region designated "7B" in FIG. 7A.
Figure 8:
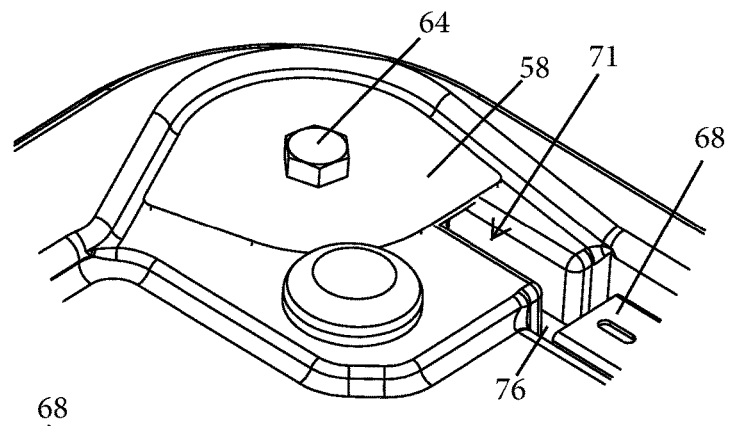
FIG. 8 is an enlarged perspective view of a lifting and mounting assembly inserted into a corner of the hopper spreader assembly.
Figure 14:
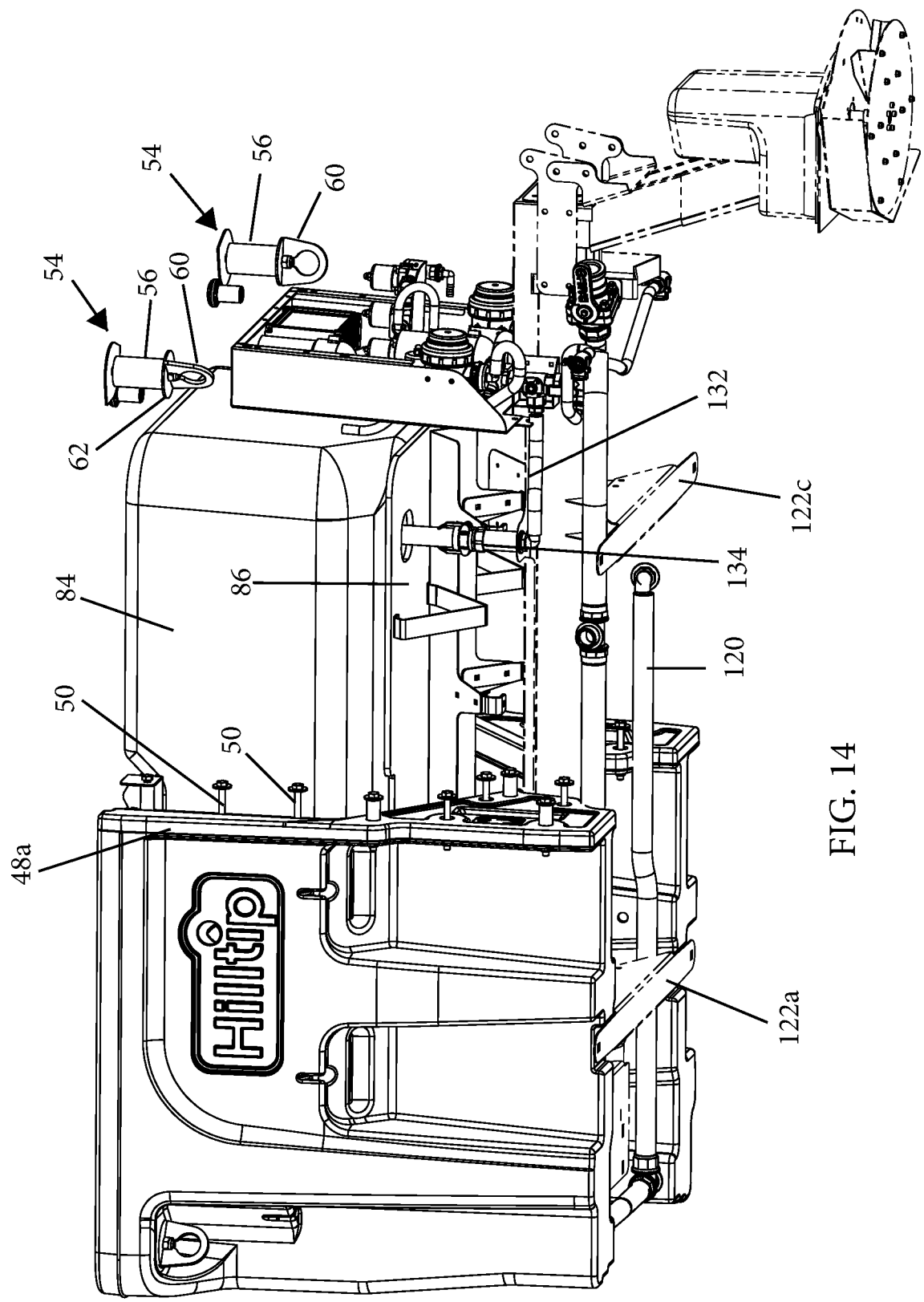
FIG. 14 is a side perspective view of the modular double-wall hopper spreader of FIG. 2, shown with an inner hopper inserted and with the rear modular hopper omitted to shown an underlying structure.

In the illustrated embodiment of FIGS. 4A, 4B, 6A and 6B, each respective corner of hopper 16 includes a corner opening 52. As best shown in FIGS. 3, 7A and 7B, each corner opening 52 receives a lifting and mounting assembly 54, which includes an elongated cylinder or spacer 56, an upper plate 58 disposed at an upper end of the cylinder 56, and a ring member 60 disposed at a lower end of the cylinder 56 (FIGS. 3 and 7B). As best shown in FIGS. 7B and 14, the ring member 60 includes a ring plate 62 perpendicularly oriented to the longitudinal axis of the cylinder 56. A corner bolt 64 extends through the upper plate 58 and the cylinder 56, and threadably engages a nut fastener 65 that is coupled to the ring plate 62. By tightening the bolt 64 and nut fastener 65, the upper plate 58 and ring plate 62 are biased against respective top and bottom ends of the corner opening 52, such as shown in FIGS. 7B and 8, with the cylinder 56 serving as a rigid spacer to prevent the module from being crushed at the corner opening 52 by over-tightening the bolt 64. The ring member 60 can then be used for lifting and securely mounting hopper spreader assembly 10 onto the bed 17 of the pick-up truck 15 (FIG. 1), or on a support structure or platform of a different support vehicle such as a heavy duty truck, trailer, or a hand cart. The lifting and mounting assembly 54 is made of metal or other rigid material in accordance with sound engineering judgment.

Figure 9:
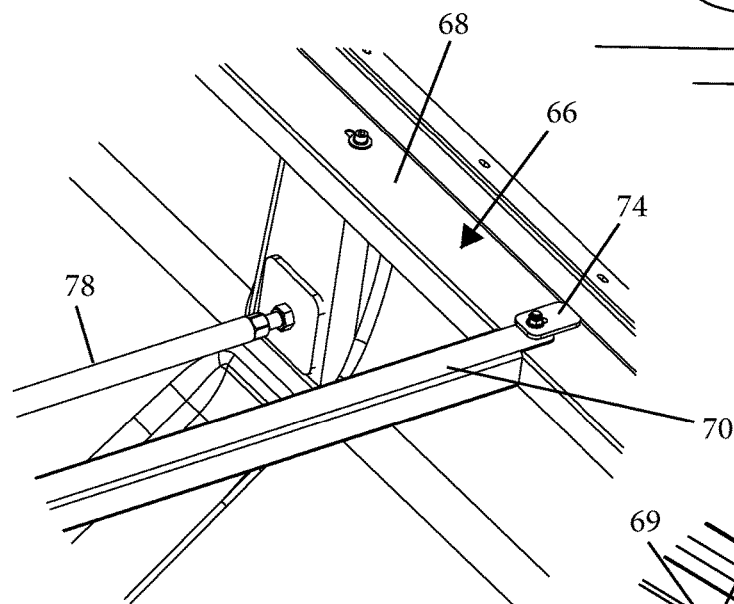
FIG. 9 is an enlarged perspective view of a section of the structural support frame of FIGS. 5A and 5B.

In the illustrated embodiment of FIGS. 3, 7A, 7B, 9 and 11, modules 18a-c are secured together by a structural support frame 66 disposed at upper portions of the inner surfaces 30a-c. The structural support frame 66 includes a pair of longitudinal and parallel bars 68, each extending along respective opposing inner surfaces 30a-c. As best shown in FIGS. 7A, 7B and 8, each opposite end of each longitudinal bar 68 is inter-coupled, via a coupling link 76 extending along an open-top channel 71, with hopper 16 at a respective cavity area 57 near each corner opening 52. The coupling link 76 can be a threaded bolt with a head 75 and a washer 73 at one end and a threaded fastener nut 77 at another end. By tightening the coupling link 76 and the fastener nut 77, the front and rear modules 18a, 18c are pressed and secured together. As can be best seen in FIGS. 7B and 8, whenever the upper plate 58 is fixed to the corner opening 52, the upper plate 58 secures the washer 73 and hence the coupling link 76 within the cavity area 57 so that the coupling link 76 cannot be lifted up and out of the open-top channel 71. Conversely, whenever the upper plate 58 is removed from the corner opening 52, the coupling link 76 can be freed from the cavity area 75 and open-top channel 71 of hopper 16 so that the bar 68 can be lifted away from the hopper 16. Thus, the structural support frame 66 provides additional structural integrity, load support and overall stability of the entire modular hopper 16. The structural support frame 66 further includes generally parallel frame rods 70 (FIGS. 2, 3 and 9) that laterally extend between and removably couple, via rod fasteners 74, the pair of longitudinal bars 68 (FIGS. 3 and 9).

Figure 10:
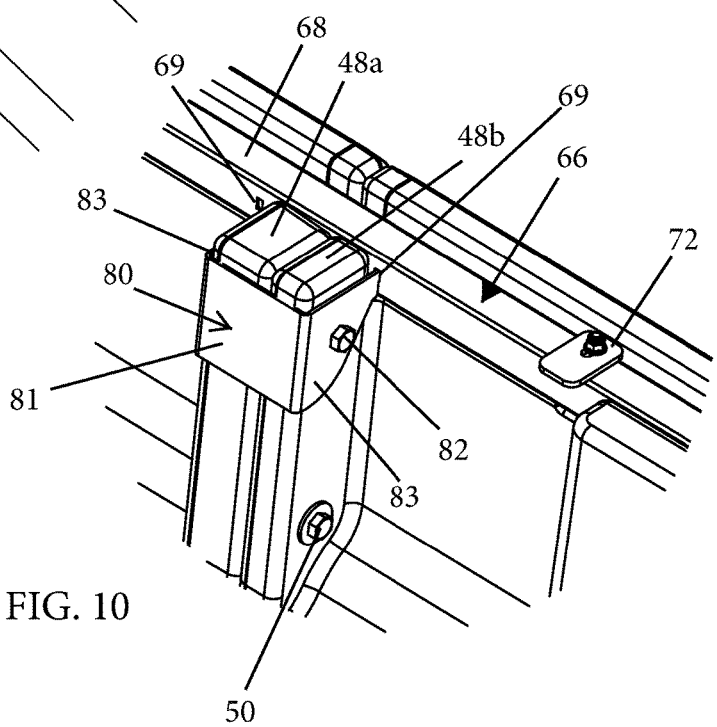
FIG. 10 is an enlarged perspective view of a structural brace of the modular hopper assembly.

As shown in FIGS. 3 and 9, modular hopper 16 may include one or more generally parallel reinforcement rods 78 laterally extending and connecting upper portions of opposite inner surfaces 30*a* and 30*c*. Also, upper portions of opposite inner surfaces 30*b* may similarly be connected by the reinforcement rod 78, if two-piece middle module 18*b* is included in hopper 16. Optionally, respective adjacent and inwardly-protruding portions of the upright-extending flanges of modules 18*a-c* may be secured together by a structural brace 80 that is removably connected to respective longitudinal bar 68 of structural support frame 66, such as shown in FIG. 10. The structural brace 80 is constructed as a U-shaped bracket having a longitudinal surface 81 extending between a pair of parallel brace side walls 83 laterally extending from the longitudinal surface 81. As best seen in FIGS. 7A and 10, each longitudinal bar 68 includes a plurality of bar openings 69 that are adapted to receive a respective tip projection of each brace side wall 83, such as shown in FIG. 10, to engage and secure the longitudinal bar with the structural brace 80. Inwardly protruding portions of flanges 48*a* and 48*b* are secured together by the structural brace 80, such as shown in FIG. 10. A brace bolt 82 may additionally be provided to longitudinally extend through the pair of parallel brace side walls 83 of the structural brace 80 and the inwardly protruding portions of adjacent flanges 48*a* and 48*b* to threadably engage a fastener (not shown in FIG. 10) to secure the middle and front modules 18*a* and 18*b* together and to provide for more secure hold and stability of the entire modular hopper 16. It should be understood that the middle and rear modules 18*b* and 18*c* may likewise be secured together.

Figure 7C:
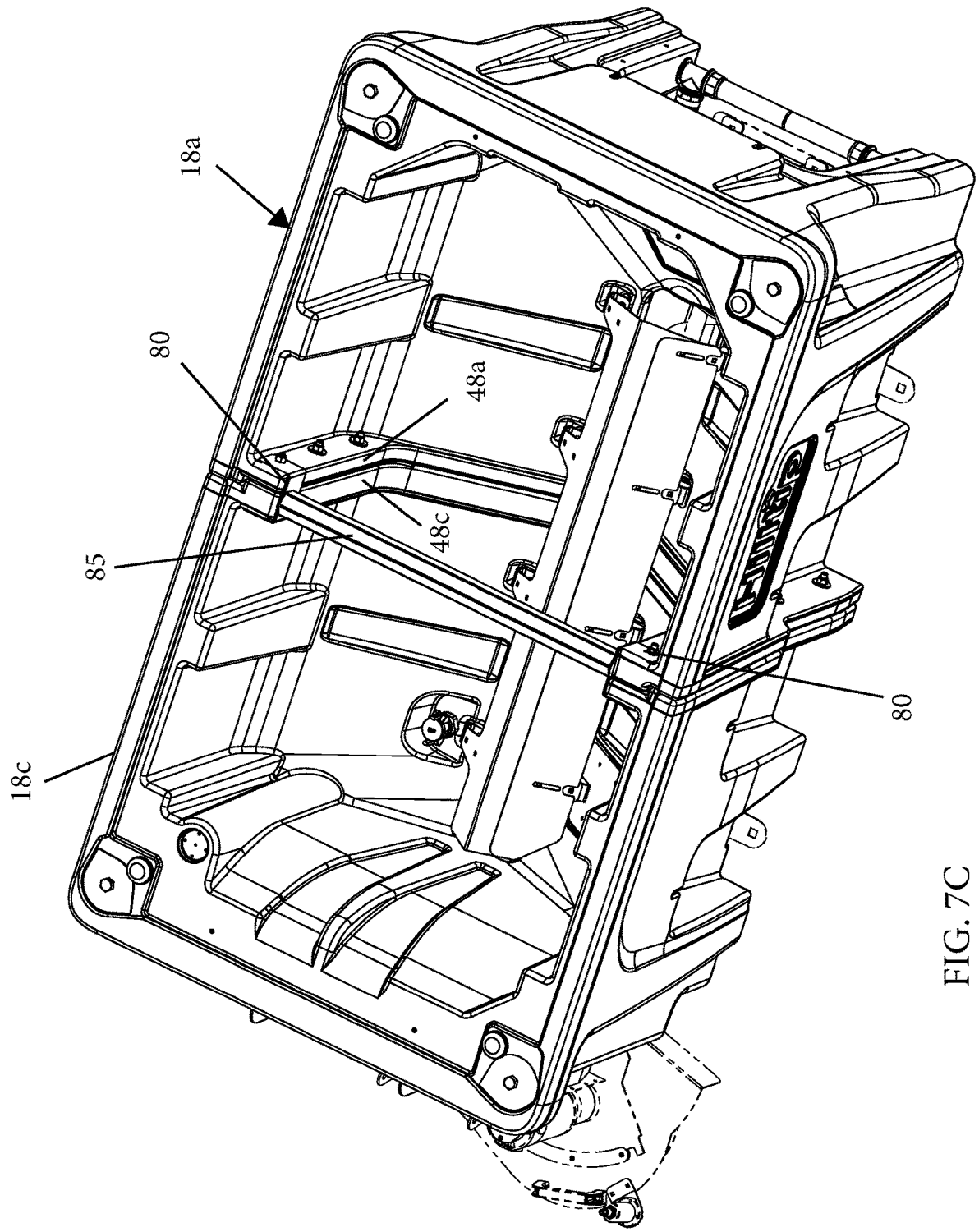
FIG. 7C is a top perspective view of the modular hopper spreader of FIG. 2, shown with a structural brace and beam inter-coupling the hopper modules.

Referring now to FIG. 7C, a pair of opposing structural braces 80 may optionally be inter-coupled together by a structural beam 85 laterally extending between the pair of opposing structural braces 80. For instance, each pair of opposing adjacent and inwardly-protruding portions of the upright-extending flanges 48*a* and 48*c* of respective modules 18*a* and 18*c* may first be secured together by respective structural brace 80, as described above. Then, the opposing structural braces 80 are intercoupled by the structural beam 85. It is envisioned that the structural beam 85 may be welded, fastened via a latch, or inserted into an opening formed in each structural brace 80, and secured to each respective structural brace 80. As shown in FIG. 7C, the structural support frame 66 may be omitted if the hopper modules are connected by the structural braces 80 and beam 85. Alternatively or additionally, the modules may be designed with interlocking features that facilitate their attachment to one another, or for increasing the rigidity of the assembled modules.

With reference to FIGS. 13A and 13B, the bottom of hopper 16 includes lateral support members 122*a* and 122*c* attached by fasteners to the bottom of hopper 16. Support members 122*a* and 122*c* are designed to provide support for an auger housing or bottom chute 124 and, optionally, may be used to securely attach hopper 16 to the bed 17 of the pick-up truck 15 (FIGS. 1 and 2). The bottom chute 124 contains an auger mechanism 125 and serves a dual function of protecting the auger mechanism 125 from the environment and as a bottom chute used to move/deliver/transfer the solid material of receptacle 32 towards the discharge end of bottom chute 124 that is proximal to the rear-end of the bed of the truck from where the solid material carried within hopper 16 may be eventually discharged onto a ground surface. Bottom chute 124 attaches to hopper 16 at the surfaces defining the bottom of rear recess 88 formed in rear module 18*c*, as shown. Bottom chute 124 may be fastened to hopper 16 by fasteners such as bolts, clamps, or rivets. Optionally, the bottom chute 124 and hopper 16 may be configured so that no separate fasteners are required to secure those components together. Alternatively, instead of the auger mechanism 125, a conveyor system (not shown) may be used to transport or convey the solid material toward the rear end of the spreader system where it can be distributed.

The auger mechanism 125 is at least partially positioned within aperture 38 and is used to move the solid material from receptacle 32 towards the end of bottom chute 124. An auger drive motor 126 and a gear box 128 are attached to the front end of the auger 125 and used to drive the auger. The drive motor 126 and gear box 128 may include and incorporate any desired gearing and connections for any energy source, including an electrical energy source 129 (FIGS. 13A and 13B), a hydraulic source, or a combustion engine. Rotation of the auger 125 causes solid material to be drawn out of receptacle 32 and to be communicated to the end of bottom chute 124, where it leaves the hopper 16. It should be understood that lengths of the bottom chute 124 and the auger mechanism 125 may vary depending on length, i.e. the short or extended versions, of the hopper 16. Similarly, the size and/or power requirements of the drive motor 126 and/or gear box 128 should vary based on sound engineering judgement.

Figure 15:
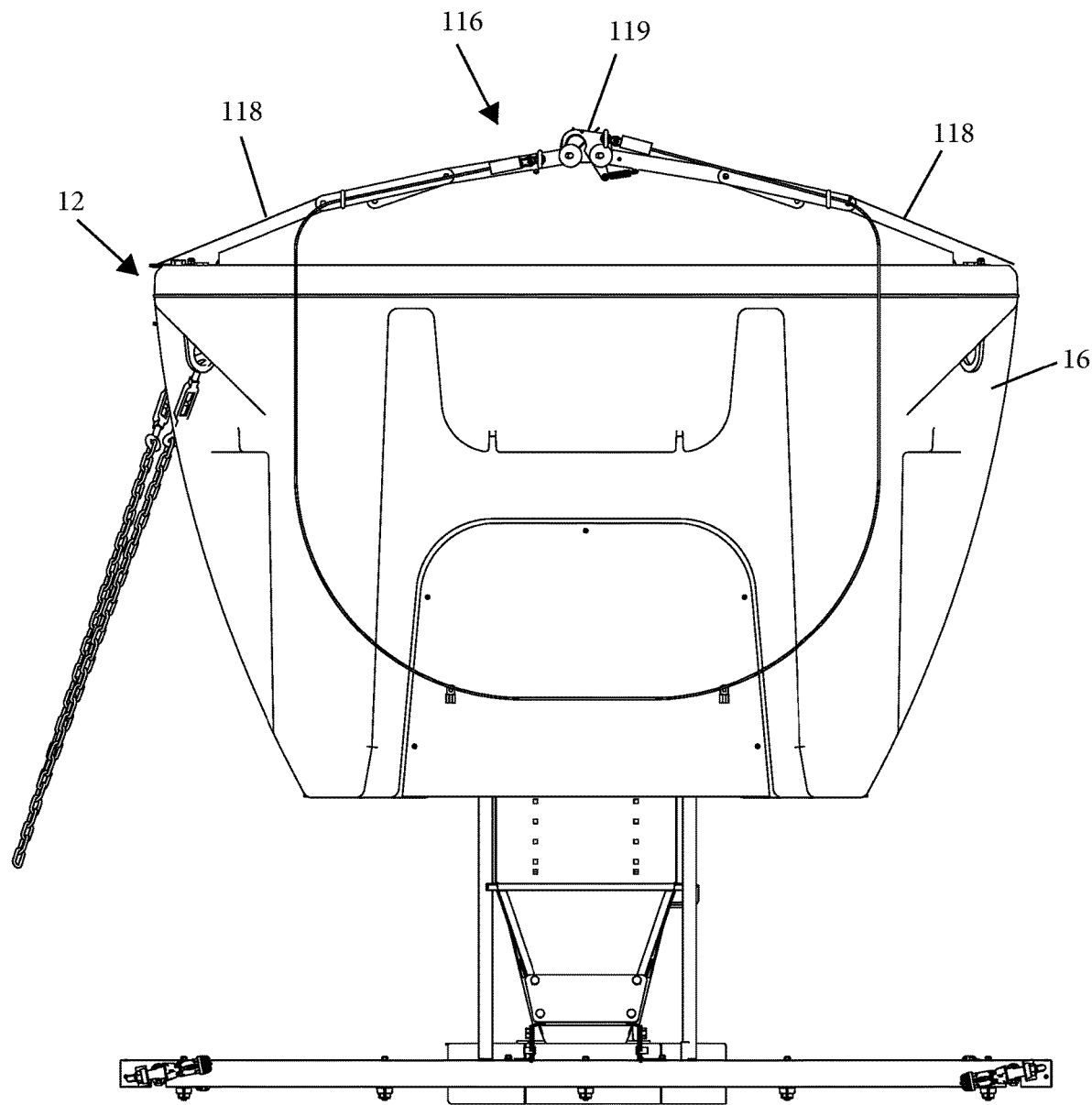
FIG. 15 is a rear elevation view of the modular double-wall hopper spreader of FIG. 2, shown with a cover support mechanism.

In an alternative embodiment shown in FIGS. 14 and 15, the hopper spreader assembly 10 further includes an inner hopper module or bladder insert 84 disposed within receptacle 32 of the hopper 16. The inner hopper module 84 defines another liquid chamber inside a soft, rigid, or semi-rigid bladder tank that is mechanically secured to and/or supported by the respective inner surface portions of the respective hopper modules used to form the hopper 16. The inner hopper module 84 forms an extra liquid tank to provide the hopper spreader assembly with extra liquid capacity, or to allow the hopper to store and dispense two or more different liquids. It is contemplated that the inner hopper module 84 may be supported by an elevated platform 86 such that a gap is formed between the bottom portion of the receptacle 32 and the inner hopper module 84. Each of the liquid chambers of the respective hopper modules 18*a-c* used to form such hopper, including the inner hopper module 84, are connected in fluid communication to various plumbing and spray equipment of the hopper spreader assembly 10, as described in more detail below.

Figure 11:
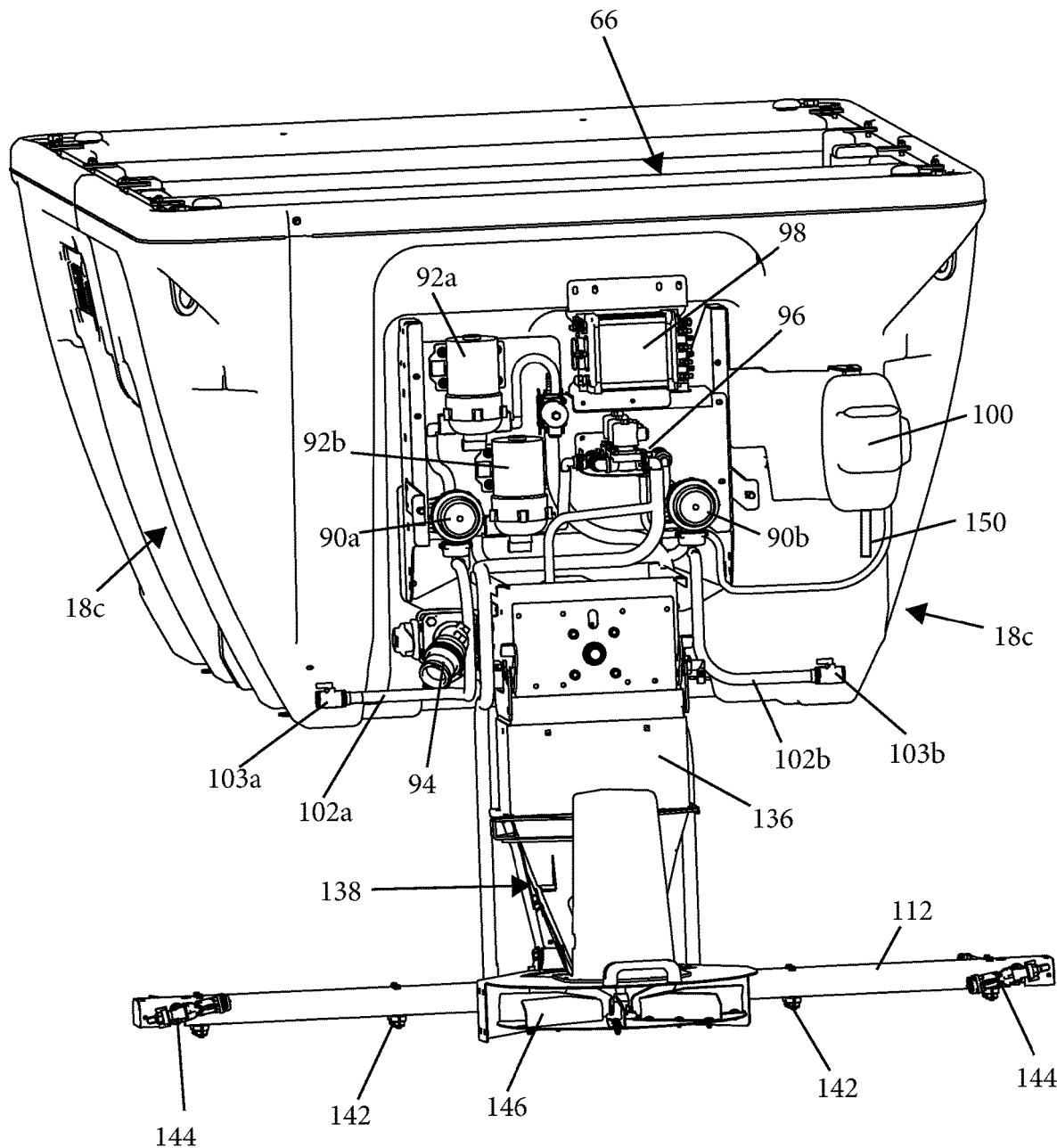
FIG. 11 is a rear perspective view of the modular hopper spreader of FIG. 2.
Figure 12:
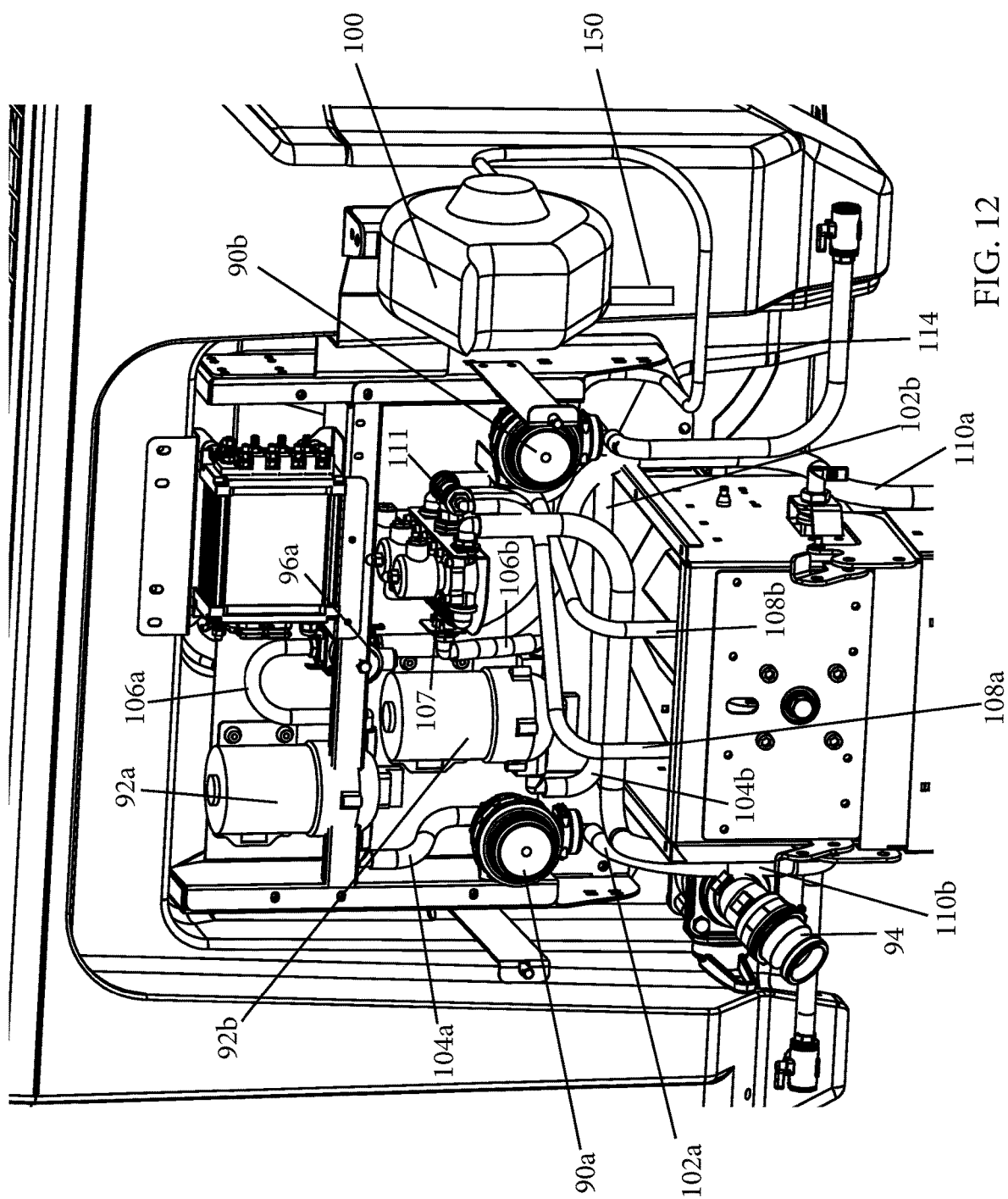
FIG. 12 is an enlarged rear perspective view depicting plumbing and control portions of the modular hopper spreader of FIG. 11.

With reference to FIGS. 11 and 12, hopper assembly 12 includes various plumbing and spray equipment that is mounted within or near a rear recess 88 (FIGS. 5A, 5B and 6A) formed in rear module 18*c*. Rear recess 88 is formed within curved inward rear end wall 28 of rear module 18*c*. Rear recess 88 is isolated from receptacle 32 by the double wall formed between the rear end wall 28 and the rear inner surface 36 of module 18*c* (FIGS. 4A-5B). In the illustrated embodiment, the plumbing and spray equipment at or near the rear recess 88 includes first and second suction filters 90*a* and 90*b* each in liquid communication with respective first and second liquid pumps 92*a* and 92*b*, a liquid filling connector 94, a set of manually and/or electrically actuated selector valves 96, and a central processing unit (CPU) controller 98 communicatively connected to the selector valves 96. The rear end wall 28 of rear module 18c may also support a hose reel 100 with a dispensing hose 150 (FIGS. 11 and 12). The supply of the pressurized liquid to the hose reel 100 is controlled by one of the selector valves 96, which selectively pressurizes the dispensing hose 150 so that it can be used by the operator to manually spray the liquid carried within the liquid chamber(s) of hopper 16, such as saline solution or liquid fertilizer, directly onto an application area of the ground. The dispensing hose 150 may be in fluid communication with each liquid chamber of modules 18a-c and/or the inner hopper module 84. It is also envisioned that, in an alternative embodiment in which the adjacent liquid reservoirs of the modules 18a-c are in fluid communication with one another via one or more fluid conduits, the dispensing hose 150 may be in fluid communication with what is effectively a single liquid reservoir formed by modules 18a-c of the extended version of hopper 16, or formed by the front and rear modules 18a and 18c of the short version of hopper 16.

According to the embodiment of FIGS. 11 and 12, the first and second suction filters 90a and 90b are fluidly connected with the liquid chamber of the rear module 18c via respective fluid lines 102a and 102b. More specifically, the fluid lines 102a and 102b are connected to the liquid chamber of the rear module 18c via their respective valve fittings 103a and 103b. According to an alternative embodiment, however, each of the first and second suction filters 90a, 90b may be in fluid communication via their respective fluid lines 102a and 102b with a fluid pipe or conduit 120 (FIGS. 13A and 13B). More specifically, the fluid lines 102a and 102b may be in fluid communication with the fluid pipe 120, via a manifold, T-shaped fitting, or Y-shaped fitting (not shown), at a point of the pipe 120 that is near the rear end wall 28 of rear module 18c and downstream of the liquid filling connector 94.

Figure 16:
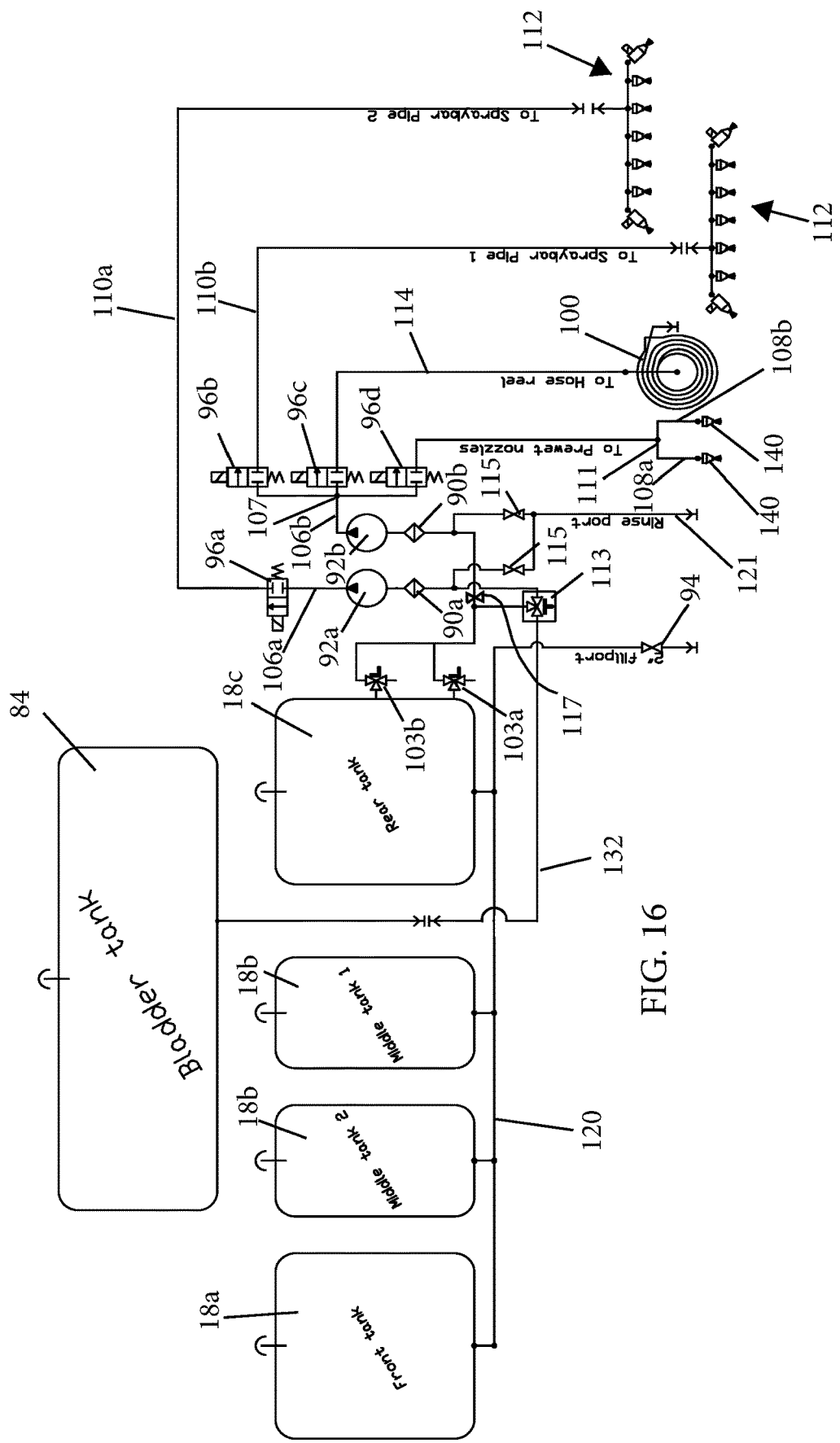
FIGS. 16 and 17 are schematic views of different liquid plumbing and spray systems of the modular hopper spreader.

As shown in FIGS. 12 and 16, the first suction filter 90a is connected in fluid communication by a first filter hose 104a with the first liquid pump 92a, and the second suction filter 90b is connected in fluid communication by a second filter hose 104b with the second liquid pump 92b. The first liquid pump 92a is connected in fluid communication by a first pump hose 106a with a first selector valve 96a. The second liquid pump 92b is connected in fluid communication by a second pump hose 106b with a valve manifold 107 adapted to connect in fluid communication with second, third, and fourth selector valves 96b, 96c, and 96d, respectively. The first and second selector valves 96a, 96b are connected in fluid communication by respective spray bar hoses 110a and 110b with a spray bar 112 (FIG. 11). The third selector valve 96c is connected in fluid communication by a reel fluid line 114 to the dispensing hose 150 on the hose reel 100. The fourth selector valve 96d is connected in fluid communication with a pre-wet spray nozzle 140 (FIGS. 2 and 3) via a second valve manifold 111 and pre-wet hoses 108a and 108b. It should be understood that each selector valve 96a-d can be electrically controlled based on operator commands transmitted wirelessly or by hard-wire. Additionally or alternatively, each selector valve 96a-d can be manually controlled by the operator.

According to the embodiment of FIGS. 13A and 13B, the fluid pipe 120 extends from the liquid filling connector 94 and around the bottom surfaces of the hopper 16. The fluid pipe 120 includes a plurality of fluid fittings 130a-c connecting each respective fluid reservoir of each module 18a-c to the fluid pipe 120, thereby providing for each of the modules to be in fluid communication with the other modules of the hopper 16. In the illustrated embodiment of FIGS. 13A and 13B, the fluid pipe 120 includes a front pair of fluid fittings 130a to connect the fluid chamber of front module 18a to the fluid pipe 120, a middle pair of fluid fittings 130b to connect the fluid chambers of two-piece middle module 18b to the fluid pipe 120, and a rear pair of fluid fittings 130c to connect the fluid chamber of rear module 18c to the fluid pipe 120. The fluid pipe 120 is supported by lateral support members 122a and 122c. It should be understood that if the two-piece middle module 18b is not included in the hopper 16, only front and rear fluid fittings 130a and 130c will be connecting the fluid chambers of respective front and rear modules 18a and 18c to the fluid pipe 120 (FIG. 13A).

Liquid directed into or out of the liquid chambers of hopper 16 may be supplied or drained via the filling pipe 120 through the liquid filling connector 94. After filling and once a connector valve 95 is closed, the liquid in the liquid chambers of the modules 18a-c will typically be present in the filling pipe 120 due to gravity. According to the embodiment of FIG. 3, each side of each module 18a-c may be fitted with a pipe on either side of the bottom chute 124 to communicatively connect one of the liquid chambers of each module to the liquid filling connector 94 and to the liquid pumps 92a or 92b, thus providing for each module 18a-c to be in individual fluid communication with the liquid pumps 92a and 92b.

Optionally, and with reference to FIG. 14, it is contemplated that the inner hopper module 84 and the liquid chambers of the modules 18a-c are not necessarily interconnected in fluid communication with one another. Instead, the inner hopper module 84 includes an independent bladder pipe 132 connected in fluid communication to a manifold valve 113 (FIG. 16) for selectively directing the liquid stored in the inner hopper module 84 for subsequent distribution to liquid pumps 90a and/or 90b and then to a dispensing apparatus, such as pre-wet spray nozzle(s) 140, hose reel 110 and/or spray bar 112. As best shown in FIG. 16, the manifold valve 113 is also fluidly connected to the valve fittings 103a and 103b such that the manifold valve 113 is operable to select from which of the liquid chambers of the inner hopper module 84 or the modules 18a-c to receive the liquid, and to which liquid pump 92a or 92b, to feed the liquid. The manifold valve 113 can be manually and/or electrically operated. Additionally, the manifold valve 113 can consist of several on/off valves to separate the fluid in the manifold valve 113 into separate fluid lines, such as shown in FIG. 16. In the illustrative embodiment of FIG. 14, the inner hopper module 84 is connected by a bladder connector 134 to the bladder pipe 132. It should thus be understood that the liquid stored in and distributed out of the inner hopper module 84 may be same or different from the liquid stored in the liquid chambers of the modules 18a-c. It should also be understood that the inner hopper module 84 may include a bladder liquid filling connector (not shown) that can be used to fill the inner hopper module with the liquid. Optionally, and with reference to FIG. 17, the inner hopper module or bladder tank 84 may be connected in direct fluid communication by the bladder pipe 132 with the rear module 18c such that inner hopper module 84 is also fluidly connected by the fluid pipe 120 with one or more middle modules 18b and front module 18a.

Figure 17:
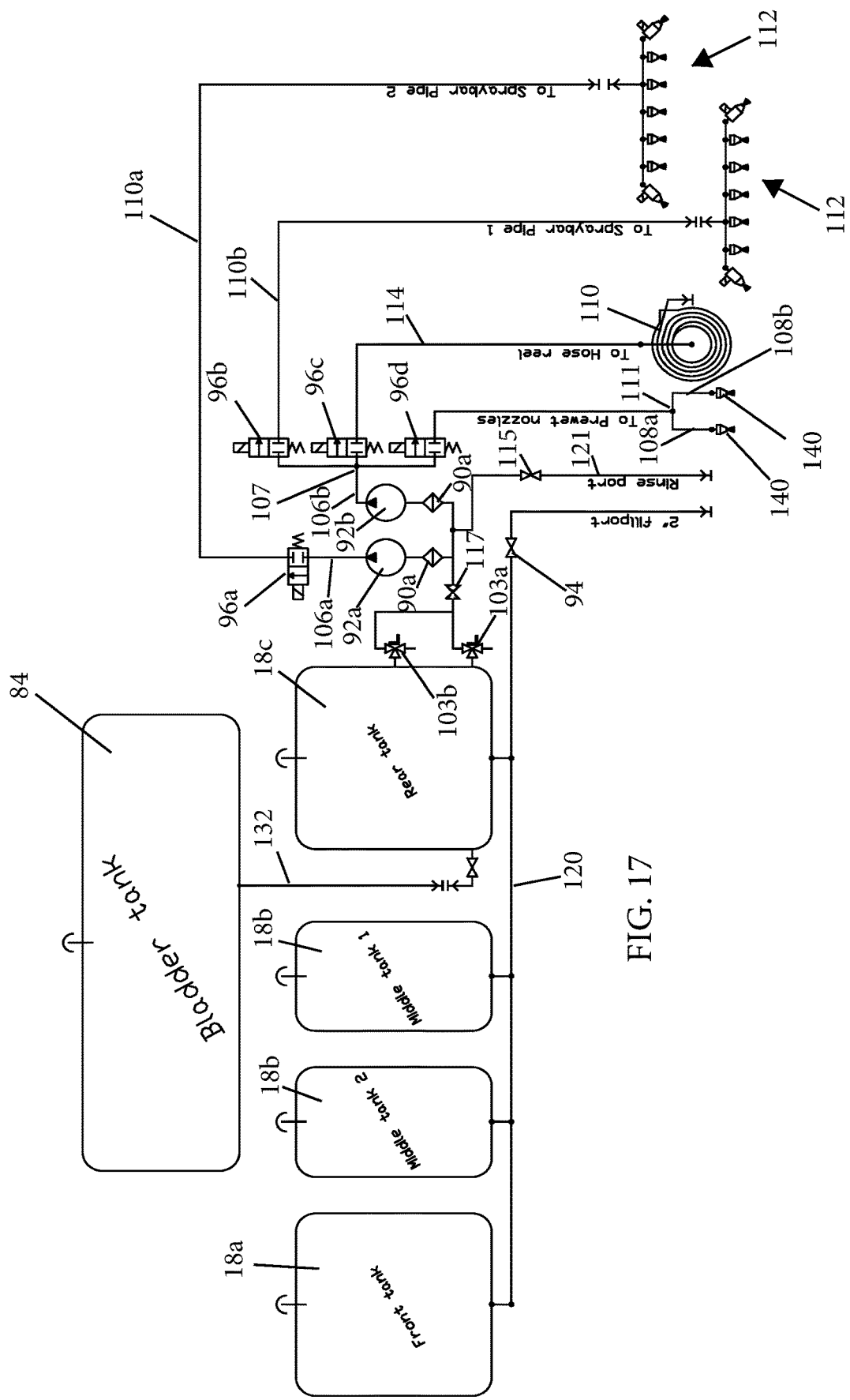

With reference to FIGS. 16 and 17, it is further contemplated that the liquid pumps 92a and 92b and/or liquid chambers of the modules 18a-c and/or the inner hopper module 84 may be rinsed, separately or together, using a rinse line 121 fitted with a rinse port valve 115. Rinse line 121 is fluidly connected with the valve fittings 103a, 103b and manifold valve 113 so that the liquid chambers of the modules 18a-c and/or inner hopper module 84 can be first filled with water, anti-freeze, or cleaning solution using the rinse line 121. Subsequently, the cleaning solution is drained via any one of the pre-wet nozzle 140, the dispensing hose 150, or the spray bar 112. To rinse liquid pumps 92a and 92b, it is envisioned that a liquid chamber rinse valve 117 is closed so that the water, anti-freeze, or cleaning solution is fed directly into the pumps for rinsing and subsequent draining via any one of the pre-wet nozzle 140, the dispensing hose 150, or the spray bar 112. Optionally, a separate liquid tank (not shown) containing water, a cleaning solution, or anti-freeze liquid solution can be carried by the hopper spreader assembly 12, such as in one of the liquid chambers described hereinabove. The separate liquid tank is envisioned to be connected to the rinse line 121 to perform the rinsing function of the liquid pumps 92a and 92b and/or liquid chambers of the modules 18a-c and/or the inner hopper module 84 as described above.

Referring now to FIG. 2, hopper assembly 12 optionally includes a screen 114. Screen 114 may be installed to prevent large debris, clumps of salt, or other granular material from being received in the receptacle 32. Screen 114 may also desirably cause clumps of salt to be broken apart during filling of the hopper 16. Screen 114 may be attached to hopper 16 by using fasteners 72 (FIGS. 7A, 7B, and 10) to hold screen 114 to hopper 16, or may be received on a track or a shelf (not shown) that is integrally-formed within hopper 16. It is also contemplated that screen 114 may be made of metal or other rigid material and act as a reinforcement structure securing the modules 18a-c together and providing enhanced overall stability to the hopper assembly 12, either in addition to or in place of the framework and/or cross members described above.

With reference to FIG. 15, hopper assembly 12 optionally includes a cover support mechanism 116. Cover support mechanism 116 may have various clamps or hooks suitable for receiving a tarp or other surface coverings to prevent foreign material from mixing with the contents in the hopper and/or from spilling of the contents outside of the hopper. In the illustrated embodiment, cover support mechanism 116 includes a pair of opposing cover arms 118, distal ends of which are pivotably joined to an upper surface of hopper 16 such that cover support mechanism 116 may be pivotally lifted and lowered, and proximal ends of which are adapted to come close together when the opposing cover arms 118 are pivotally lowered. It is also envisioned that at least one proximal end of the cover arms 118 may include a hook or a latch 119 to securely couple another proximal end of the cover arms 118 when the opposing cover arms 118 are pivotally lowered. Hopper assembly 12 may also include an equipment cover 148 (FIG. 1) to protect the plumbing and spray equipment mounted at rear recess 88 of rear module 18c from weather conditions and/or vehicle spray.

The spreader assembly 14 (FIG. 2) serves to distribute the solid granular material carried within receptacle 32 of hopper 16 onto the ground or road surface. Optionally, the spreader assembly 14 also distributes liquid received from the modules 18a-c, which liquid may be sprayed, via the pre-wet nozzle 140, onto the solid granular material before the resulting mixture is discharged. As shown in FIG. 11, spreader assembly 14 includes a vertical chute assembly 136 and a spinner assembly 138. Vertical chute assembly 136 is securely attached by fasteners to bottom chute 124 and receives the solid material discharged from receptacle 32 of hopper 16 via the discharge aperture of bottom chute 124 and an aperture of vertical chute assembly 136 that are in fluid communication with one another. Vertical chute assembly 136 is selectively secured to bottom chute 124 and is generally vertically oriented and positioned perpendicular to bottom chute 124, in an operating mode. Vertical chute assembly 136, which is generally hollow, includes a body portion formed as one or more pieces of plastic or metal components. Optionally, the liquid spray bar 112 is provided, as shown in FIG. 11, to spray the liquid material carried within the liquid chamber(s) of hopper 16, and/or inner hopper module 84, directly onto an application area of the ground. In the illustrated embodiment, spray bar 112 may include downward spray nozzles 142 and/or a plurality of side spray nozzles 144. Further, vertical chute assembly 136 may be pivotably connected to bottom chute 124 and hydraulically or electrically controlled, via hydraulic or electrically-driven mechanism(s), and is adapted to be pivotally raised from and lowered to its generally perpendicular position with respect to bottom chute 124.

Spinner assembly 138 includes the pre-wet spray nozzle 140 (FIG. 2) that is selectively connected in fluid communication with the liquid chambers of the modules 18a-c via fourth selector valve 96d and pre-wet hoses 108a and 108b, and/or with the inner hopper module 84. Pre-wet spray nozzle 140 serves to pre-wet the solid contents of receptacle 32, which is moved by the auger (not shown) to spinner assembly 138, so that the solid content takes the form of a slurry being distributed over an application area by spinner assembly 138. The spinner assembly 138 also includes a spinner plate 146. Spinner assembly 138 may be powered either via a hydraulic unit, a belt and pulley system, or an electric motor. The hydraulic unit, belt, or motor rotates plate 146 so that when the solid material lands on plate 146, it is spread broadly over the ground area. The spinner assembly 138 may at least partially surround plate 146 and the hydraulic unit, belt or motor, as shown.

According to the embodiments described above, the hopper assembly includes individual liquid chambers that may be inter-connected in fluid communication with one another to effectively form a single liquid reservoir filled with a liquid, and an extra liquid chamber of the inner hopper module that may be provided in the hopper assembly and that can be filled with the same or different liquid material. The liquid material(s) of the individual liquid chambers and the extra liquid chamber may be selectively dispensed by using any one of the spraying equipment of the hopper assembly, such as the pre-wet nozzle, spray bar, and dispensing hose. Alternatively, the individual liquid chambers of the hopper assembly may not be inter-connected in fluid communication with one another, and thus can be individually filled with the same or different liquids, and individually and selectively dispensed by using any one of the spraying equipment.

Thus, the present invention provides a hopper spreader assembly that includes a modular dual wall hopper with a solid material receptacle and individual liquid storage tanks for spreading solid particles and/or spraying one or more liquids onto the ground and/or road surfaces in a fully controllable, convenient and efficient manner. The modular hopper is adaptable to be selectively shortened or elongated in order to accommodate different sizes of vehicles and/or volumes of solid and/or liquid materials to be distributed. The modular hopper also reduces the sloshing of liquid in the modular liquid reservoirs, optionally without the use of baffles, as compared to unitary or contiguous liquid reservoirs.

While the foregoing description describes several embodiments of the present invention, it will be understood by those skilled in the art that variations and modifications to these embodiments may be made without departing from the spirit and scope of the invention, as defined in the claims below, as interpreted according to the principles of patent law including the doctrine of equivalents. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A hopper spreader assembly comprising:
    a first rigid dual-wall hopper module having a first liquid chamber defined between a first inner surface portion and a first outer surface portion, wherein said first inner surface portion is U-shaped including a forward region disposed between opposing rearwardly-directed side regions that terminate in respective lateral flanges;
    a second rigid dual-wall hopper module having a second liquid chamber defined between a second inner surface portion and a second outer surface portion, wherein said second inner surface portion is U-shaped including a rearward region disposed between opposing forwardly-directed side regions that terminate in respective lateral flanges;
    a fluid conduit for filling or draining a liquid into or out of said first and second liquid chambers;
    a liquid pump in fluid communication with said first and second liquid chambers for drawing the liquid from said first and second liquid chambers;
    a selector valve in fluid communication with said liquid pump for directing the liquid drawn from said first and second liquid chambers; and
    a liquid dispenser in fluid communication with said selector valve for distributing the liquid onto an application area;
    wherein said first and second inner surface portions of said rigid dual-wall hopper modules cooperate to directly form forward, rearward, and side regions of a solid material receptacle for receiving and storing solid material;
    wherein said first and second dual-wall hopper modules are configured to be secured directly together with said first dual-wall hopper module positioned forwardly of said second dual-wall hopper module, said lateral flanges of said first dual-wall hopper module configured to be secured to said lateral flanges of said second dual-wall hopper module, and with said rearwardly-directed side regions of said first inner surface portion aligned with respective ones of said forwardly-directed side regions of said second inner surface portion; and
    wherein said hopper spreader assembly is sized and shaped to be received on a bed of a truck or a support vehicle.

2. The hopper spreader assembly of claim 1, wherein said fluid conduit is configured to inter-connect said first and second hopper modules in fluid communication with one another, and wherein said fluid conduit comprises a plurality of liquid fittings, each liquid fitting adapted to fluidly connect a respective one of said first or second liquid chambers with said fluid conduit.

3. The hopper spreader assembly of claim 1 further comprising a central processing unit (CPU) communicatively connected to said selector valve and operable to control said selector valve.

4. The hopper spreader assembly of claim 3, wherein said liquid dispenser comprises a pre-wet nozzle, a hose reel with a dispensing hose, and a spray bar, each selectively supplied with the liquid through said selector valve controlled by said CPU.

5. The hopper spreader assembly of claim 3, wherein said selector valve is electrically operable in response to operator commands received from said CPU, and manually operable in response to manual intervention by an operator.

6. The hopper spreader assembly of claim 1, wherein each of said first and second hopper modules includes a pair of corner openings configured to receive respective lifting and mounting assemblies, each said lifting and mounting assembly comprising an elongated spacer, an upper plate disposed at an upper end of said spacer, a ring member with a ring plate and a nut fastener disposed at a lower end of said spacer, and a corner bolt extending through said spacer and threadably engaging said nut fastener.

7. The hopper spreader assembly of claim 1, wherein said first and second hopper modules are secured together by a structural support comprising a pair of generally parallel rods extending longitudinally along said first and second inner surface portions, wherein opposite end portions of each rod are configured to couple to respective corner portions of said first and second hopper modules, and wherein said rods are coupled together by at least one structural bar laterally extending between said rods.

8. The hopper spreader assembly of claim 1, further comprising:
    a third dual-wall hopper module disposed between said first and second hopper modules and having a third liquid chamber defined between a third inner surface portion and a third outer surface portion;
    wherein said first, second, and third dual-wall hopper modules are correspondingly shaped and cooperate to directly form said solid material receptacle; and
    wherein each of said first, second, and third liquid chambers is in fluid communication with said selector valve that directs the liquid drawn from said first, second, and third liquid chambers to said liquid dispenser for distributing the liquid onto the application area.

9. The hopper spreader assembly of claim 8, wherein said third dual-wall hopper module comprises a forward flange configured to be secured to one of said lateral flanges of said first dual-wall hopper module, and a rearward flange configured to be secured to one of said lateral flanges of said second dual-wall hopper module, and further comprising structural braces for securing adjacent ones of said flanges.

10. The hopper spreader assembly of claim 8, wherein said third dual-wall hopper module comprises separate left and right module portions disposed on opposite lateral sides of said hopper.

11. The hopper spreader assembly of claim 8, wherein said first, second, and third liquid chambers are interconnected in fluid communication with one another to form a single liquid reservoir, and wherein said first, second, and third inner surface portions are at least partially angled and converging at a bottom of said receptacle so that said receptacle is shaped as a trough.

12. The hopper spreader assembly of claim 1 further comprising a hopper module insert defining a third liquid chamber disposed within said receptacle, wherein said third liquid chamber is in fluid communication with said selector valve and said liquid dispenser, and wherein said third liquid chamber is not connected in fluid communication with said first and second liquid chambers.

13. The hopper spreader assembly of claim 12, wherein said selector valve comprises a plurality of selector valves including a first selector valve configured to direct the liquid drawn from said third liquid chamber to at least one of a pre-wet nozzle, spray bar, and a dispensing hose of a hose reel, and a second selector valve configured to direct the liquid drawn from said first and second liquid chambers to the at least one of said pre-wet nozzle, said spray bar, and said dispensing hose.

14. The hopper spreader assembly of claim 12 further comprising a rinse line with a rinse port valve fluidly connected to said first, second, and third liquid chambers, wherein said rinse line is configured to fill said first, second, and third liquid chambers with a cleaning solution to be drained through said liquid dispenser.

15. The hopper spreader assembly of claim 1 further comprising a spreader assembly that includes (i) a pre-wet nozzle and a spray bar of said liquid dispenser and (ii) a spinner system, wherein said hopper defines a lower aperture for receiving an auger or conveyor mechanism that is adapted to move the solid material from said receptacle to said spreader assembly.

16. A hopper spreader assembly comprising:
a first rigid dual-wall hopper module having a first liquid chamber defined between a first inner surface portion and a first outer surface portion;
a second rigid dual-wall hopper module having a second liquid chamber defined between a second inner surface portion and a second outer surface portion;
a lifting assembly positioned at each of a pair of opposite forward corners of said first rigid dual-wall hopper module and a pair of opposite rearward corners of said second rigid dual-wall hopper module;
a fluid conduit for filling or draining a liquid into or out of said first and second liquid chambers;
a liquid pump in fluid communication with said first and second liquid chambers for drawing the liquid from said first and second liquid chambers;
a hose reel with a dispensing hose for distributing the liquid onto an application area;
a pre-wet nozzle for distributing the liquid onto the application area; and
a selector valve in fluid communication with said fluid pump for directing the liquid drawn from said first and second liquid chambers to said hose reel and said pre-wet nozzle;
wherein said first and second inner surface portions of said rigid dual-wall hopper modules cooperate to directly form a solid material receptacle for receiving and storing solid material;
wherein said first and second dual-wall hopper modules are configured to be secured directly together with said first dual-wall hopper module positioned forwardly of said second dual-wall hopper module to directly form forward, rearward, and side regions of a solid material receptacle for receiving and storing solid material;
wherein said hopper spreader assembly is liftable as a unit at said lifting assemblies; and
wherein said hopper spreader assembly is sized and shaped to be received on a bed of a truck or a support vehicle, and said lifting assemblies are further configured for securing said hopper spreader assembly to the bed.

17. The hopper spreader assembly of claim 16 further comprising a spray bar, wherein said selector valve is configured to direct the liquid drawn from said first and second liquid chambers to said spray bar.

18. The hopper spreader assembly of claim 17 further comprising a hopper module insert defining a third liquid chamber disposed within said receptacle, wherein said third liquid chamber is in fluid communication with said selector valve and said hose reel, said pre-wet nozzle and said spray bar, and wherein said third liquid chamber is not connected in fluid communication with said first and second liquid chambers.

19. A hopper spreader assembly comprising:
a first rigid dual-wall hopper module having a first liquid chamber defined between a first inner surface portion and a first outer surface portion, wherein said first inner surface portion is U-shaped including a forward region disposed between opposing rearwardly-directed side regions that terminate in respective lateral flanges;
a second rigid dual-wall hopper module having a second liquid chamber defined between a second inner surface portion and a second outer surface portion, wherein said second inner surface portion is U-shaped including a rearward region disposed between opposing forwardly-directed side regions that terminate in respective lateral flanges;
a third rigid dual-wall hopper module disposed between said first and second hopper modules and having a third liquid chamber defined between a third inner surface portion, a third outer surface portion, a forward lateral flange, and a rearward lateral flange;
a fluid conduit for filling or draining a liquid into or out of said first, second, and third liquid chambers;
a liquid pump operable to draw the liquid from said first, second, and third liquid chambers;
a hose reel with a dispensing hose operable to distribute the liquid onto an application area;
a pre-wet nozzle operable to distribute the liquid onto the application area; and
a selector valve in fluid communication with said fluid pump for directing the liquid drawn from said first, second, and third liquid chambers to said hose reel and said pre-wet nozzle;
wherein one of said lateral flanges of said first dual-wall hopper module is configured to be secured to said forward lateral flange of said third dual-wall hopper module, one of said lateral flanges of said second dual-wall hopper module is configured to be secured to said rearward lateral flange of said third dual-wall hopper module, and said lateral flanges of said first dual-wall hopper module are configured to be secured to said lateral flanges of said second dual-wall hopper module, with said rearwardly-directed side regions of said first inner surface portion aligned with respective ones of said forwardly-directed side regions of said second inner surface portion;
wherein said first, second, and third inner surface portions of said rigid dual-wall hopper modules cooperate to directly form forward, rearward, and side regions of a solid material receptacle for receiving and storing solid material when said first, second, and third rigid dual-wall hopper module are secured directly together;
wherein said fluid conduit extends along a lower surface of each of said first, second, and third hopper modules and comprises a plurality of liquid fittings, each of which is adapted to fluidly connect a respective one of said first, second, and third liquid chambers with said fluid conduit; and wherein said hopper spreader assembly is sized and shaped to be received on a bed of a truck or a support vehicle.

20. The hopper spreader assembly of claim 19 further comprising a hopper module insert defining a fourth liquid chamber disposed within said receptacle, wherein said fourth liquid chamber is in fluid communication with said selector valve, said hose reel, and said pre-wet nozzle, and wherein said fourth liquid chamber is not connected in fluid communication with said first, second, and third hopper modules.

21. The hopper spreader assembly of claim 1 further comprising an electrical energy source configured to power electrical equipment of said hopper spreader assembly.

* * * * *